(12) United States Patent
Schlögl et al.

(10) Patent No.: US 9,797,052 B2
(45) Date of Patent: Oct. 24, 2017

(54) ELECTROLYTIC WATER SPLITTING USING A CARBON-SUPPORTED $MNO_x$-COMPOSITE

(71) Applicant: Fritz Haber Institut der Max Planck Gesellschaft, Berlin (DE)

(72) Inventors: Robert Schlögl, Berlin (DE); Katharina Mette, Berlin (DE); Malte Behrens, Essen (DE); Jean-Philippe Tessonnier, Ames, IA (US); Arno Bergmann, Berlin (DE); Peter Strasser, Berlin (DE)

(73) Assignee: Fritz Haber Institut der Max Planck Gesellschaft, Berlin (DE)

( * ) Notice: Subject to any disclaimer, the term of this patent is extended or adjusted under 35 U.S.C. 154(b) by 275 days.

(21) Appl. No.: 14/381,706

(22) PCT Filed: Feb. 28, 2013

(86) PCT No.: PCT/EP2013/054029
§ 371 (c)(1),
(2) Date: Aug. 28, 2014

(87) PCT Pub. No.: WO2013/127920
PCT Pub. Date: Sep. 6, 2013

(65) Prior Publication Data
US 2015/0068917 A1    Mar. 12, 2015

(30) Foreign Application Priority Data
Feb. 28, 2012 (EP) ..................................... 12157274

(51) Int. Cl.
*C25B 11/04*    (2006.01)
*C25B 1/04*    (2006.01)
(Continued)

(52) U.S. Cl.
CPC .......... *C25B 11/0405* (2013.01); *B82Y 30/00* (2013.01); *C25B 1/04* (2013.01);
(Continued)

(58) Field of Classification Search
CPC .............................. C25B 11/0405; C25B 1/04
See application file for complete search history.

(56) References Cited

U.S. PATENT DOCUMENTS

2010/0252445 A1* 10/2010 Highgate .............. C02F 1/4674
205/628
2012/0305407 A1* 12/2012 Anderson ................. C25B 1/02
205/619
2013/0131399 A1*  5/2013 Weiner ................. B01J 37/0205
568/885

FOREIGN PATENT DOCUMENTS

EP        2 045 213 A1    4/2009
EP        2 140 934 A1    1/2010
(Continued)

OTHER PUBLICATIONS

Mohammad et al. ("Electrocatalysis by nanoparticles: Optimization of the loading level and operating pH for the oxygen evolution at crystalographically oriented manganese oxide nanorods modified electrodes", Electrochimica Acta 53 (2008) 4351-4358).*
(Continued)

*Primary Examiner* — Nicholas A Smith
(74) *Attorney, Agent, or Firm* — Wolf, Greenfield & Sacks, P.C.

(57) ABSTRACT

The present invention relates to the electrolytic splitting of water using a carbon-supported manganese oxide ($MnO_x$) composite. Specifically, the present electrolytic splitting of water is carried under neutral electrolyte conditions with a high electrolytic activity, while using an oxygen evolution reaction (OER)-electrode comprising the present carbon-supported $MnO_x$ composite. Next, the present invention (Continued)

relates to a process for producing such a carbon-supported $MnO_x$ composite as well as to a composite obtainable by the present process for producing the same and to an OER-electrode comprising the carbon-supported $MnO_x$ composite obtainable by the present process.

10 Claims, 18 Drawing Sheets

(51) Int. Cl.
*B82Y 30/00* (2011.01)
*C25B 11/14* (2006.01)
*H01M 4/88* (2006.01)
*H01M 4/90* (2006.01)
*H01M 4/92* (2006.01)

(52) U.S. Cl.
CPC ........ *C25B 11/041* (2013.01); *C25B 11/0415* (2013.01); *C25B 11/0447* (2013.01); *C25B 11/0452* (2013.01); *C25B 11/14* (2013.01); *H01M 4/8842* (2013.01); *H01M 4/8846* (2013.01); *H01M 4/9016* (2013.01); *H01M 4/926* (2013.01); *Y02E 60/366* (2013.01); *Y02P 20/135* (2015.11)

(56) References Cited

FOREIGN PATENT DOCUMENTS

| EP | 1 831 440 B1 | 9/2010 |
|---|---|---|
| GB | 167041 A | 8/1921 |
| WO | WO 2006/055670 A2 | 5/2006 |
| WO | WO 2010/027336 A1 | 3/2010 |
| WO | WO 2010/146475 A1 | 12/2010 |
| WO | WO 2011/094456 A1 | 8/2011 |

OTHER PUBLICATIONS

European Search Report dated Jul. 27, 2012 for Application No. EP 12157274.7.
International Search Report and Written Opinion dated Apr. 17, 2013 for Application No. PCT/EP2013/054029.
Cheng et al., Carbon-supported manganese oxide nanocatalysts for rechargeable lithium-air batteries. J Power Sources. 2010;195:1370-4.
Chervin et al., Redesigning air cathodes for metal-air batteries using $MnO_x$-functionalized carbon nanofoam architectures. J Power Sources. 2012;207:191-8.
Gorlin et al., A bifunctional nonprecious metal catalyst for oxygen reduction and water oxidation. J Am Chem Soc. Oct. 6, 2010;132(vol. 132 issue 39):13612-4. doi: 10.1021/ja104587v.
Jiao et al., Nanostructured manganese oxide clusters supported on mesoporous silica as efficient oxygen-evolving catalysts. Chem Commun (Camb). May 7, 2010;46(17):2920-2. doi: 10.1039/b921820c. Epub Mar. 29, 2010.
Ortel et al., Mesoporous $IrO_2$ Films Templated by PEO-PB-PEO Block-Copolymers: Self-Assembly, Crystallization Behavior, and Electrocatalytic Performance. Chem Mater. 2011;23(13):3201-9.
Takashima et al., Mechanisms of pH-Dependent Activity for Water Oxidation to Molecular Oxygen by $MnO_2$ Electrocatalysts. J Am Chem Soc. 2012;134:1519-27.
Zhang et al., Manganese dioxide-coated carbon nanotubes as an improved cathodic catalyst for oxygen reduction in a microbial fuel cell. J Power Sources. 2011;196:9284-9.
Office Communication for CN 201380011533.3 dated Nov. 18, 2016.

\* cited by examiner

Figure 7 (a) and (b)
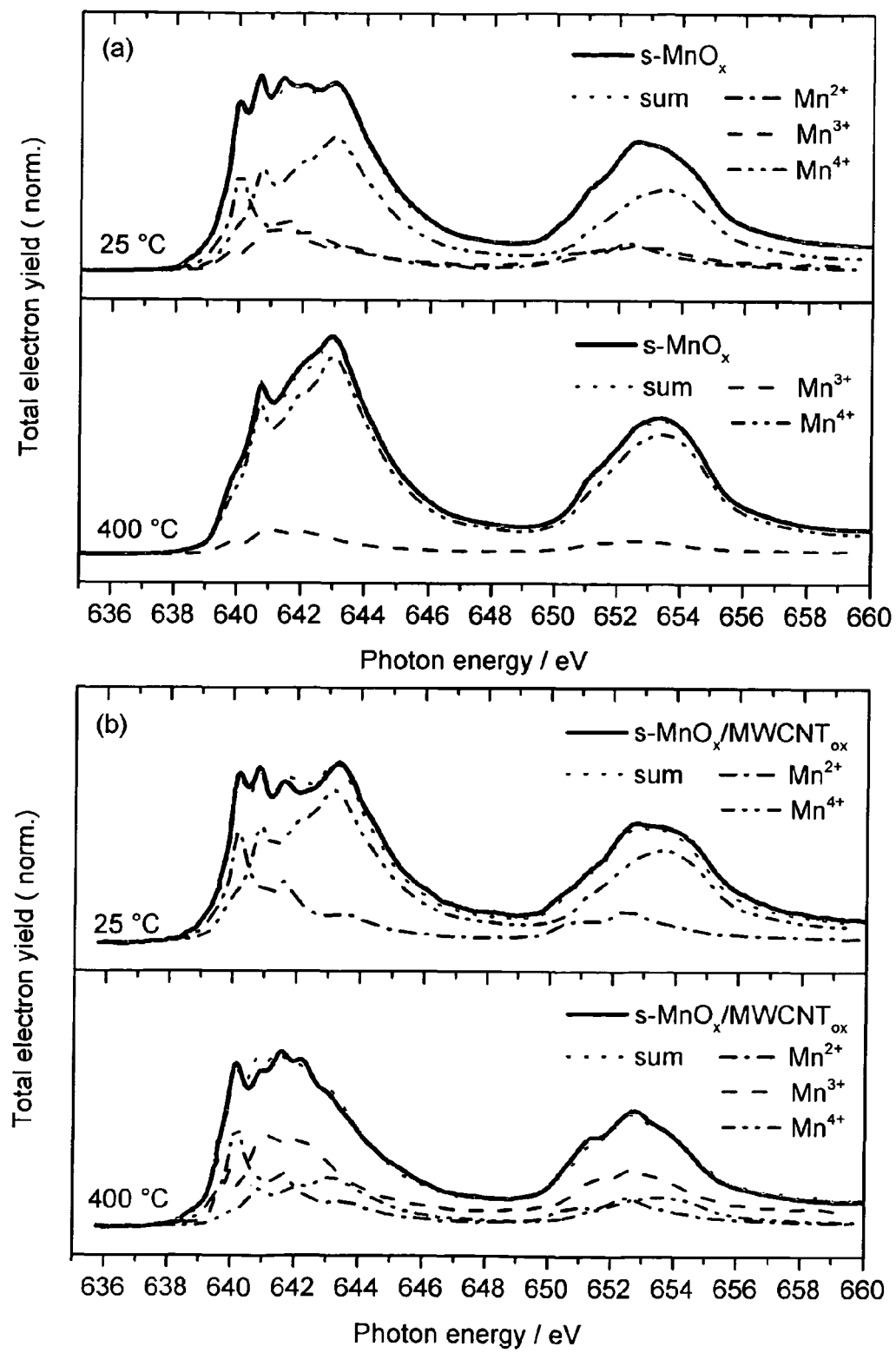

ELECTROLYTIC WATER SPLITTING USING A CARBON-SUPPORTED MNO$_x$-COMPOSITE

RELATED APPLICATIONS

This application is a national stage filing under 35 U.S.C. §371 of International Patent Application Serial No. PCT/EP2013/054029, filed Feb. 28, 2013, which was published under PCT Article 21 (2) in English. International Patent Application Serial No. PCT/EP2013/054029 claims the benefit of priority of European Patent Application Serial No. EP12157274.7, filed Feb. 28, 2012. Each of these references is incorporated herein by reference in its entirety.

TECHNICAL FIELD OF THE INVENTION

The present invention relates to the electrolytic splitting of water using a carbon-supported manganese oxide (MnO$_x$) composite. Specifically, the present electrolytic splitting of water is carried under neutral electrolyte conditions with a high electrolytic activity, while using an oxygen evolution reaction (OER)-electrode comprising the present carbon-supported manganese oxide (MnO$_x$) composite. Next, the present invention relates to a process for producing such a carbon-supported manganese oxide (MnO$_x$) composite as well as to a composite obtainable by the present process for producing the same and to an OER-electrode comprising the carbon-supported manganese oxide (MnO$_x$) composite obtainable by the present process.

BACKGROUND OF THE INVENTION

Electrolytic water splitting into hydrogen and oxygen is a key future technology for regenerative energy storage. While wind, solar photovoltaic or hydro sources produce renewable electricity, it is generally intermittent in nature. In this context hydrogen is a key energy carrier which can be stored either directly in molecular form or by further reversible conversion into hydrogen carrier molecules. The stored molecular energy of hydrogen can later be used for combustion or, more efficiently, in hydrogen fuel cells.

A key challenge in the electrolytic splitting of water is the development of a suitable anode electrode, i.e. an oxygen evolution reaction (OER)-electrode, having a low overpotential, a good stability and a high activity. Specifically, the provision of an OER-electrode having at the same time a suitable activity and stability, i.e. being inert, represents a major technical challenge due to the highly oxidizing conditions at the oxygen evolution electrode.

Ortel, E. et al. (Chem. Mater. (2011), 23, 3201.) describes a proton exchange membrane (PEM) electrolyser technology which makes use of Ti-supported TiO$_2$—IrO$_2$— or TiO$_2$—RuO$_2$-based mixed metal oxide systems as dimensionally stable anodes, while employing Pt as cathode material. However, to allow a wide-spread application at affordable costs, such systems should contain no or a minimal amount of noble metals.

In this respect, transition metal oxides have attracted considerable attention. Gorlin, Y. J. et al. (Am. Chem. Soc. (2010), 132, 13612.) describes a Mn oxide thin film which is electrodeposited onto a polished glassy carbon substrate. Under alkaline conditions, the Mn oxide thin film was found to be active for both, the oxygen reduction reaction (ORR), i.e. the cathode reaction in a fuel cell, and the oxygen evolution reaction (OER), i.e. the anode reaction in an electrolytic cell. However, for industrial purposes a more practical, scalable and inexpensive processes for preparing such an electrode is desired, while still maintaining a high electrolytic activity and stability. Moreover, to allow a wide-spread an environmentally acceptable application of such electrodes it is desirable to provide an electrode which achieves a high electrolytic activity under neutral electrolyte conditions, rather than under alkaline electrolyte conditions.

Jiao, F. et al. (Chem. Commun. (2010), 46 2920.) and WO 2011/094456 A1 describe silica-supported Mn oxide clusters which can be applied as OER-electrode in a neutral solution. However, a suitable OER-electrode must also exhibit a sufficient electronic conductivity in order to minimize ohmic losses and to increase current density during the electrolytic reaction, thus, enabling an economic operation of an electrolytic cell with a reduced overpotential.

WO 2010/027336 A1 describes MnO$_2$ decorated single wall nanotubes being prepared by a symproportionation precipitation method comprising a simple drying step at 100° C. The MnO$_2$ decorated single wall nanotubes are used as an electrode in a supercapacitor comprising an acid polymer electrolyte.

EP 2 140 934 A1 describes a catalyst material comprising aggregates of nanoneedles of manganese dioxide and having a mesoporous structure. The catalyst material is used to oxidatively decompose water under acidic conditions to produce oxygen gas.

Finally, EP 1 831 440 B1 describes a method for preparing a supported catalyst by functionalizing carbon nanotubes with an oxidizing agent to form functionalized carbon nanotubes prior to loading a metal catalyst onto said functionalized carbon nanotubes.

Accordingly, in view of the prior art there is a demand for a process for splitting water under neutral electrolyte conditions, i.e. under environmental acceptable conditions which e.g. allow the splitting of waste water and/or seawater, while achieving a high, and preferably an improved, electrolytic activity and in particular a low overpotential in an oxygen evolution reaction, yet being stable and inert vis-à-vis the oxidizing conditions seen during the oxygen evolution reaction. Moreover, in view of the prior art there is a demand for a process for preparing a material for the splitting of water under neutral conditions, while employing practical, inexpensive and scalable techniques which can be effectively used in an industrial setting.

SUMMARY OF INVENTION

The present invention surprisingly solves the above outlined problems and provides a process for the splitting water under neutral electrolyte conditions, while achieving a high electrolytic activity by using a carbon-supported MnO$_x$-composite. Specifically, the present carbon-supported MnO$_x$-composite is used as oxygen evolution reaction (OER)-electrode in an electrolytic cell. Accordingly, the present process for the splitting water can be employed under environmentally acceptable conditions, e.g. for the splitting of waste water and/or seawater. Moreover, the present invention provides a process for producing such a carbon-supported MnO$_x$-composite which can be used as OER-electrode for the splitting of water under neutral conditions. Specifically, the present process employs inexpensive and scalable techniques including the steps of an impregnation and/or a symproportionation precipitation method, while obtaining a carbon-supported MnO$_x$-composite being stabile, i.e. being inert against the oxidizing conditions of an oxygen evolution reaction, providing a low overpotential in an oxygen evolution reaction and having a high electrolytic activity under neutral electrolyte conditions. Moreover, the present invention provides an OER-electrode which comprises the carbon-supported $MnO_x$-composite as obtained by the process of preparing a carbon-supported $MnO_x$-composite of the present invention.

(1) Specifically, the present invention provides a process for the electrolytic splitting of water using a composite comprising a carbon-based support and a manganese oxide ($MnO_x$).

(2) The process of number (1), wherein the manganese oxide is nanoparticular and homogenously dispersed and deposited on the carbon-based support.

(3) The process of number (1) or (2), wherein the carbon-based support is a carbon-nanostructured material, preferably a carbon-nanofiber and/or a carbon-nanotube (CNT) which CNT is more preferably a single-walled CNT (SW-CNT) and most preferably a multi-walled CNT (MWCNT).

(4) The process of number (2) or (3), wherein the nanoparticular manganese oxide has a particle size of 1-50 nm, preferably 2-10 nm and more preferably 5 nm, as determined by transition electron microscope (TEM) micrographs.

(5) The process of any one of numbers (1)-(4), wherein the weight ratio of manganese oxide to carbon-based support, is 1-10 wt.-%, preferably 4.5-7 wt.-%, more preferably 5-6.5 wt.-% and most preferably 5 wt.-% or 6.5 wt.-%.

(6) The process of any one of numbers (1)-(5), wherein the composite has a BET surface area of 200-400 m$^2$/g, and preferably 300-350 m$^2$/g as determined by $N_2$ physisorption.

(7) The process of any one of number (1)-(6), wherein the composite is obtainable by an impregnation method, preferably an incipient wetness impregnation method, or a symproportionation precipitation method.

(8) The process of number (7), wherein the impregnation method comprises the steps of (a) providing the carbon-based support with a manganese oxide precursor, (b) drying and (c) calcinating.

(9) The process of number (7), wherein the symproportionation precipitation method comprises the steps of (a) providing the carbon-based support with a manganese oxide precursor, (a1) adding a symproportionation precipitation agent, (b) drying and (c) calcinating.

(10) The process of number (8) or (9), wherein the manganese oxide precursor is a Mn(+II) salt, preferably $MnCO_3$ and more preferably $Mn(NO_3)_2$ and optionally the symproportionation precipitation agent is a Mn(+VII) salt, preferably MnO4$^-$, more preferably $KMnO_4$.

(11) The process of any one of numbers (7)-(10), wherein step (b) is carried out over a time period of 1-48 hours, preferably 4-24 hours, more preferably 6-16 hours, still more preferably 6-12 hours.

(12) The process of any one of numbers (7)-(11), wherein step (b) is carried out at a temperature of below 100° C., preferably 20-80° C., more preferably 40-60° C. and most preferably at 60° C.

(13) The process of any one of numbers (7)-(12), wherein step (c) is carried out at a temperature ranging from 100-600° C., preferably from 150-550° C., more preferably 250-450° C., even more preferable 300-400° C.

(14) The process of any one of number (7)-(13), which further comprises the step of functionalizing the carbon-based support prior to step (a), and in particular functionalizing the SWCNT support or the MWCNT support, by an oxidation agent which is preferably selected from nitric acid, sulphuric acid, potassium chlorate, persulfate or hydrogen peroxide, and is preferably nitric acid, to create linker groups for the manganese oxide precursor.

(15) The process of any one of number (1)-(14), wherein the composite is used as oxygen evolution electrode.

(16) The process of any one of numbers (1)-(15) having neutral electrolyte conditions, and which electrolyte is optionally waste water, seawater and/or freshwater.

Besides the present process for the electrolytic splitting of water, the present invention provides

(17) a process for preparing a composite which can be optionally used for the electrolytic splitting of water according to any one of numbers (1)-(16), preferably under neutral electrolyte conditions, which process comprises the steps of
(a) providing a carbon-based support with a solution of a manganese oxide precursor, optionally
(b) drying the obtained product at a temperature of 20-80° C., and
(c) calcinating the product of step (b), and optionally functionalizing the carbon-based support by an oxidation agent prior to step (a) to create linker groups for the manganese oxide precursor.

(18) The process of number (17), wherein the carbon-based support is a carbon-nanostructured material, preferably a carbon-nanofiber and/or a carbon-nanotube (CNT) which is more preferably a single-walled CNT (SWCNT) and most preferably a multi-walled CNT (MWCNT).

(19) The process of number (17) or (18), wherein the manganese oxide precursor is a Mn(+II) salt, preferably $MnCO_3$ and more preferably $Mn(NO_3)_2$.

(20) The process of any one of number (17)-(19) for preparing a composite comprising a nanoparticular manganese oxide having an oxidation state which is selected from Mn(+III), Mn(+IV) or mixtures thereof.

(21) The process of number (19), and particularly the process of number (20) which further comprises the step of (a1) adding a Mn(+VII) salt, preferably MnO4$^-$, more preferably $KMnO_4$, in between steps (a) and (b) to cause a symproportionation precipitation of the Mn(+II) salt and the Mn(+VII) salt (symproportionation precipitation method).

(22) The process of any one of number (17)-(19) for preparing a composite comprising a nanoparticular manganese oxide having an oxidation sate which is selected from Mn(+II), Mn(+III) or mixtures thereof.

(23) The process of any one of numbers (17)-(19) and particularly the process of number (22) which does not comprise the step of adding a Mn(+VII) salt to cause a symproportionation precipitation of the manganese oxide precursor and the Mn(+VII) salt (impregnation method).

(24) The process of any one of number (17)-(23), wherein the nominal loading of the manganese oxide precursor indicated in step (a) of number 17 in respect to the carbon-based support, which is preferably a SWCNT or more preferably a MWCNT, is 1-10 wt.-%, preferably 4.5-7 wt.-%, more preferably 5-6.5 wt.-% and most preferably 5 wt.-% or 6.5 wt.-%.

(25) The process of any one of numbers (17)-(24), wherein step (b) is carried out over a time period of 1-48 hours, preferably 4-24 hours, more preferably 6-16 hours, still more preferably 6-12 hours.

(26) The process of any one of numbers (17)-(25), wherein step (b) is carried out at a temperature of 40-60° C. and most preferably at 60° C.

(27) The process of any one of number (17)-(26), wherein step (b) is carried out under the following conditions (i)-(iii): (i) at 20-80° C. over a time period of 6-16 hours or 6-12 hours, more preferably (ii) at 40-60° C. over a time period of 6-16 hours or 6-12 hours, and most preferably (iii) at 60° C. over a time period of 6-16 hours or 6-12 hours.

(28) The process of any one of numbers (17)-(27), which process further comprises a second drying step (b1) at a temperature of 90-110° C. in between steps (b) and (c), which second drying step is preferably carried out over a time period of 1-24 hours.

(29) The process of any one of numbers (17)-(24), wherein step (c) is directly carried out after step (a) without carrying out step (b).

(30) The process of any one of numbers (17)-(29), wherein step (c) is carried out at a temperature ranging from 100-600° C., preferably from 150-550° C., more preferably 250-450° C., even more preferable 300-400° C., and most preferably at 300° C.

(31) The process of any one of numbers (17)-(30), wherein step (c) is carried out over a time period of at least 30 minutes.

(32) The process of any one of numbers (17)-(27), wherein solely a single drying step is carried before calcinating the dried product at 300° C.

(33) The process of any one of numbers (17)-(32), wherein the oxidation agent is selected from nitric acid, sulphuric acid, potassium chlorate, persulfate or hydrogen peroxide, and is preferably nitric acid.

Finally, the present invention relates to

(34) A composite obtainable by the process according to any one of number (17)-(33), wherein the composite comprises a carbon-based support and a nanoparticular manganese oxide which is homogenously dispersed and deposited on the carbon-based support.

(35) The composite of number (34), wherein the carbon-based support is a carbon-nanostructured material, preferably a carbon-nanofiber and/or a carbon-nanotube (CNT) which is more preferably a single-walled CNT (SWCNT) and most preferably a multi-walled CNT (MWCNT) which are optionally functionalized according to the process of number (17) and in this case referred to as $SWCNT_{ox}$ and $MWCNT_{ox}$, respectively.

(36) The composite of number (34) or (35), wherein the nanoparticular manganese oxide has a particle size of 1-50 nm, preferably 2-10 nm and more preferably below 5 nm, as determined by transition electron microscope (TEM) micrographs.

(37) The composite of any one of numbers (34)-(36), wherein the weight ratio of nanoparticular manganese oxide to carbon-based support, which is preferably a SWCNT support and more preferably a MWCNT support is 1-10 wt.-%, preferably 4.5-7 wt.-%, more preferably 5-6.5 wt.-% and most preferably 5 wt.-%.

(38) The composite of any one of numbers (34)-(37), wherein the BET surface area is 200-400 m²/g, and preferably 300-350 m²/g as determined by $N_2$ physisorption.

(39) The composite of any one of numbers (34)-(38), wherein the manganese oxide is an oxide of Mn(+II), Mn(+II/+III) and/or Mn(+III), and the carbon-based support is a CNT, which is optionally functionalized according to number (17), and wherein the composite is particularly obtainable by a process including the impregnation method and which composite is referred to as i-MnO$_x$/CNT.

(40) The composite of any one of number (34)-(38), wherein the manganese oxide is an oxide of Mn(+IV) and the carbon-based support is a CNT, which is optionally functionalized according to number (17), and wherein the electrode is particularly obtainable by a process including the symproportionation precipitation and which composite is referred to as s-MnO$_x$/CNT.

(41) The composite of any one of numbers (34) to (40), which is comprised in an oxygen evolution reaction (OER)-electrode for the electrolytic splitting of water under neutral electrolyte conditions, in particular, for the electrolytic splitting of waste water, seawater and/or freshwater.

(42) Use of the composite according to any one of number (34) to (41) as an electrode, preferably an OER-electrode.

(43) Use of number (42), wherein the electrode is used in the electrolytic splitting of water, wherein the water is optionally waste water, seawater and/or freshwater.

(44) An electrode comprising the composite of any one of number (34) to (41).

(45) The electrode of number (44), which is an OER-electrode for the electrolytic splitting of water.

(46) The electrode of number (44) or (45), wherein the weight ratio of nanoparticular manganese oxide to carbon-based support in the composite is 5-6.5 wt.-%, and preferably 5 wt.-% or 6.5 wt.-%.

(47) The electrode of any one of numbers (44) to (46), wherein the composite has been prepared by employing the impregnation method.

(48) The electrode of any one of numbers (44) to (47), wherein the carbon-based supported of the composite is a carbon nanotube (CNT), preferably a MWCNT or a SWCNT, which has been functionalized according to number (17), wherein the weight ratio of nanoparticular manganese oxide to CNT is 5 wt.-%, and wherein the composite has been prepared by employing the impregnation method.

(49) The electrode of any one of numbers (44) to (48), and in particular the electrode of number (46), which is an OER-electrode for the electrolytic splitting of waste water, seawater and/or freshwater.

(50) A photoelectrochemical water splitting device comprising the composite according to any one of numbers (34) to (41) or an electrode according to any one of numbers (44)-(49).

(51) The photoelectrochemical water splitting device of number (50), wherein the carbon-based supported of the composite is a carbon nanotube (CNT), preferably a MWCNT or a SWCNT, which has been functionalized according to number (17), wherein the weight ratio of nanoparticular manganese oxide to CNT is 5 wt.-%, and wherein the composite has been prepared by employing the impregnation method.

(52) In specifically preferred embodiment of the present invention, a process for the electrolytic splitting of water using a composite comprising a carbon-based support and a manganese oxide (MnO$_x$) is provided, wherein the manganese oxide is nanoparticular and homogenously dispersed and deposited on the carbon-based support, wherein the carbon-based support is obtainable by an impregnation method, preferably an incipient wetness impregnation method, or a symproportionation precipitation method, which impregnation method comprises the steps of (a) providing the carbon-based support with a manganese oxide precursor, (b) drying and (c) calcinating, wherein step (b) is carried out at a temperature of 20-80° C. over a time period of 4-24 hours or at a temperature of 40-60° C. over a time period of 1-48 hours and step (c) is carried out at a temperature ranging from 250-450° C.

(53) Further preferred, the process of number (52), wherein the carbon-based support is a single-walled CNT (SWCNT) and/or a multi-walled CNT (MWCNT).

(54) Even further preferred, the process of number (52) or (53), wherein the process further comprises a step of functionalizing the carbon-based support prior to step (a), and in particular functionalizing the SWCNT support and/or the MWCNT support, by an oxidation agent which is preferably selected from nitric acid, sulphuric acid, potassium chlorate, persulfate or hydrogen peroxide, and is preferably nitric acid, to create linker groups for the manganese oxide precursor.

(55) Even further preferred, the process of any one of numbers (52)-(54), wherein the weight ratio of manganese oxide to carbon-based support, and in particular with respect to the SWCNT support and/or the MWCNT support, is 1-10 wt.-%, preferably 4.5-7 wt.-%, more preferably 5-6.5 wt.-% and most preferably 5 wt.-% or 6.5 wt.-%.

Besides the specifically preferred embodiments of the present process for the electrolytic splitting of water, the present invention provides in a further specifically preferred embodiment

(56) a process for preparing a composite which can be optionally used for the electrolytic splitting of water according to any one of numbers (52)-(55), preferably under neutral electrolyte conditions, which process comprises the steps of (a) providing a carbon-based support with a solution of a manganese oxide precursor,
(b) drying the obtained product at a temperature of 20-80° C. over a time period of 4-24 hours or at a temperature of 40-60° C. over a time period of 1-48 hours, and
(c) calcinating the product of step (b) at a temperature ranging from 250-450° C., and
optionally functionalizing the carbon-based support by an oxidation agent prior to step (a) to create linker groups for the manganese oxide precursor.

(57) Still further preferred, the process of number (56), wherein the carbon-based support is a single-walled CNT (SWCNT) and/or a multi-walled CNT (MWCNT).

(58) Further preferred, the process of number (57), wherein the SWCNT support and/or the MWCNT support is functionalized prior to step (a) by an oxidation agent preferably selected from nitric acid, sulphuric acid, potassium chlorate, persulfate or hydrogen peroxide to create linker groups for the manganese oxide precursor.

(59) Even further preferred, the process of any one of number (56)-(58), wherein the nominal loading of the manganese oxide precursor indicated in step (a) of number (56) in respect to the carbon-based support, and in particular in respect to the SWCNT support and/or the MWCNT support, is 1-10 wt.-%, preferably 4.5-7 wt.-%, more preferably 5-6.5 wt.-% and most preferably 5 wt.-% or 6.5 wt.-%.

At the end, in a specifically preferred embodiment, the present invention relates to

(60) a composite obtainable by the process according to any one of number (56)-(59), wherein the composite comprises a carbon-based support and a nanoparticular manganese oxide which is homogenously dispersed and deposited on the carbon-based support.

(61) Further preferred is a composite of number (60), wherein the carbon-based support is a single-walled CNT (SWCNT) and/or a multi-walled CNT (MWCNT).

(62) Even further preferred is a composite of number (60) or (61), wherein the carbon-based support is a single-walled CNT (SWCNT) and/or a multi-walled CNT (MWCNT) which are functionalized according to the process of number (58) and in this case referred to as SWCNT$_{ox}$ and MWCNT$_{ox}$, respectively.

(63) Further preferred is a composite of any one of numbers (60)-(62), wherein the weight ratio of nanoparticular manganese oxide to carbon-based support, which is in particular a SWCNT$_{ox}$ support and/or a MWCNT$_{ox}$ support, is 1-10 wt.-%, preferably 4.5-7 wt.-%, more preferably 5-6.5 wt.-% and most preferably 5 wt.-%.

(64) Further preferred is the composite of any one of numbers (60)-(63), which is comprised in an oxygen evolution reaction (OER)-electrode for the electrolytic splitting of water under neutral electrolyte conditions, in particular, for the electrolytic splitting of waste water, seawater and/or freshwater.

(65) Also specifically preferred is the use of the composite according to any one of number (60) to (64) as an electrode, preferably an OER-electrode.

(66) In a specifically preferred embodiment, an electrode comprising the composite of any one of number (60) to (64) is provided.

(67) Further, specifically preferred is a photoelectrochemical water splitting device comprising the composite according to any one of numbers (60) to (64) or an electrode according to any one of number (66).

DETAILED DESCRIPTION OF THE INVENTION

Electrolytic Splitting of Water

Electrolytic splitting of water is the decomposition of water ($H_2O$) into hydrogen ($H_2$) and oxygen ($O_2$). In an electrolysis cell an electrical power source is connected to two electrodes which are placed in water. At the negatively charged cathode, a reduction reaction takes place according to the following half-reaction:

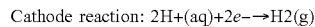
Cathode reaction: $2H^+(aq) + 2e^- \rightarrow H_2(g)$

At the positively charged anode, an oxidation reaction takes place according to the following half-reaction:

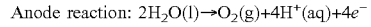
Anode reaction: $2H_2O(l) \rightarrow O_2(g) + 4H^+(aq) + 4e^-$

Accordingly, the cathode is referred to hydrogen evolution reaction (HER)-electrode and the anode is referred to as oxygen evolution reaction (OER)-electrode.

Overpotential is an electrochemical term which refers to the potential difference between a half-reaction's thermodynamically determined reduction potential and the potential at which the reaction is experimentally observed, and thus describes the cell voltage efficiency. The overpotential overcomes various kinetic activation barriers of the electrolytic cell and varies between cells and operational conditions.

An electrocatalyst is a catalyst that participates in an electrochemical reaction and serves to reduce activation barriers of a half-reaction, and thus, reduces the overpotential of said reaction.

The present invention provides a process for splitting of water using a composite comprising a carbon-based support and a manganese oxide ($MnO_x$) which composite is used as oxygen evolution electrode.

The carbon-based support preferably includes a carbon-nanostructured material, e.g. a carbon-nanofiber and/or a carbon-nanotube (CNT). A nanostructured material refers to a material with dimensions in the nanometer range. Accordingly, at least one dimension of the nanostructured material is less than 100 nm. CNTs have unique structural properties, e.g. they possess electronic conductivity, a high surface area and tuneable functional groups for a defined interaction with a precursor of an active component to be supported by the CNT. CNTs can be single-walled (SWCNT), double-walled CNTs (DWCNT) or multi-walled CNTs (MWCNT). A single-walled CNT can be defined by a cylindrical sheet with a diameter of 0.5-20 nm, whereas the CNTs may have a length of several micrometer. The pore volume of the CNTs as determined by $N_2$ physisorption can be assigned to inner channels which are characterized by a diameter of 3 nm or less and to larger pores formed between the entangled nanotubes which are characterized by a diameter of >10 nm.

Even though a composite comprising a carbon-based support and one or more non-noble transition metal oxides of elements such as cobalt (Co), iron (Fe), nickel (Ni), iridium (Ir), and/or ruthenium (Ru) can be used for the electrocatalytic splitting of water, the present invention focuses on carbon-based supported manganese oxides. The term "manganese oxides" ($MnO_x$) refers to manganese oxides with oxidation states +II (MnO, NaCl structure type), +II/+III ($Mn_3O_4$, tetragonally distorted or cubic spinel type), +III ($Mn_2O_3$, three polymorphs), and +IV ($MnO_2$, several polymorphs). In aqueous environment furthermore the hydroxides $Mn(OH)_2$ and MnOOH are relevant.

The manganese oxide is preferably nanoparticular and homogenously dispersed and deposited on the carbon-based support. The term "nanoparticular" refers to particles having a diameter of their largest projection area in the nanometer range. Specifically, the nanoparticular manganese oxide has preferably a particle size of 1-50 nm, more preferably 5-10 nm and more preferably 5 nm, as determined by transition electron microscope (TEM) micrographs. The expression "homogenously dispersed" refers to a distribution of the nanoparticular manganese oxide particles deposited on the carbon-based support without large variations in the local concentration across the accessible carbon-based support surface. Specifically, such local concentration of deposited manganese oxide may vary by 40% or less, preferably 35% or less, more preferably 20% or less and most preferably by 10% as determined by SEM-EDX studies.

Moreover, the present composite is preferably characterized by a reduced load of manganese oxide particles onto the carbon-based support. Specifically, the weight ratio of manganese oxide to carbon-based support in the composite is preferably 1-10 wt.-%, more preferably 4.5-7 wt.-%, even more preferably 5-6.5 wt.-% and most preferably 5 wt.-%.

Further, the present composite is characterized by a high surface area. Specifically, the composite has a BET surface area of 200-400 m$^2$/g, and preferably 300-350 m$^2$/g as determined by $N_2$ physisorption.

Finally, the terms "neutral electrolyte conditions" or "neutral conditions" refers to an electrolyte having a pH in the range of 4.5-8.5, preferably 5.5-8.5 and more preferably 6-8.5, and most preferably 7.0 or 7.5 to 8.5. In particular, for the electrolytic splitting of seawater, the pH is preferably in a range of 7.0-8.5. For the electrolytic of freshwater the pH is preferably in a range of 6.5-7.5 and most preferably 7.

Methods of Preparation

In order to obtain a homogenous dispersed deposition of nanoparticular manganese oxide on the carbon-based support, preferably on the carbon nanotubes (CNT), the present composite is prepared by a method including either an incipient wetness impregnation step or a symproportionation precipitation step as will be outlined in the following. The incipient wetness impregnation step as well as the symproportionation precipitation step are both easy to handle, inexpensive, scalable and industrially applicable, and thus, particularly suited for the present invention.

Functionalization of the Carbon-Based Support

The present invention preferably employs a method of functionalizing the carbon-based support, in particular the CNTs, in order to create linker and/or anchoring groups for the metal oxide precursor, in particular the $MnO_x$ precursor to be added in a subsequent step. The CNTs which are pre-treated by a step of functionalization provide a better distribution and dispersion of the metal oxide precursor within the carbon nanotube network structure, and thus, can yield a better catalytic activity.

Functionalization of CNTs can be accomplished by contacting the CNTs with an appropriate reagent as described in WO 97/32571 or preferably by contacting them with an oxidizing agent. Hence, when oxidizing agents are used for functionalizing the CNTs, the terms "functionalized" and "oxidized" may be used interchangeably. Accordingly, functionalized multi-walled CNTs are referred to as $MWCNT_{ox}$ and functionalized single-walled CNTs are referred to as $SWCNT_{ox}$.

The oxidation agent for functionalizing the carbon-based support, in particular the CNTs, such MWCNTs or SWCNTs is preferably selected from nitric acid ($HNO_3$), sulphuric acid ($H_2SO_4$), potassium chlorate ($KClO_3$), persulfate or hydrogen peroxide, and is preferably nitric acid. Moreover, $CO_2$, $O_2$, steam, $N_2O$, NO, $NO_2$, $O_3$ or $ClO_2$ can be used.

Generally, the CNTs are treated with the oxidizing agent, such as a 65% $HNO_3$ solution, under stirring at temperatures of 60-120° C., preferably at 100° C. for 8-16 hours. Subsequently, the reaction mixture is cooled down to room temperature, filtrated, rinsed with distilled water until a neutral pH of the filtrate is reached. The oxidized CNT product is optionally dried over night at temperature ranges from 100-120° C., preferably at 110° C.

Oxidized CNTs, e.g. $MWCNT_{ox}$ typically exhibit a negative surface charge when suspended in aqueous solutions (negative Zeta potential for pH>4) due to the deprotonation of carboxylic acid groups formed during the oxidizing treatment. Hence, positively charged metal oxide precursors such a $MnO_x$ precursor electrostatically interact and adsorb on oxidized CNTs, and thus, their dispersion and distribution as well as their anchoring on the CNTs is improved which may contribute to a homogenous deposition of nanoparticular $MnO_x$ on the CNT surface. Moreover, the oxidizing pre-treatment of CNTs serves to remove residual growth catalysts of the CNT preparation as well as amorphous impurities.

Impregnation Method

The present invention may employ a step of impregnation for preparing the present composite which is preferably a incipient wetness impregnation. Accordingly, the manganese oxide precursor, is dissolved in an aqueous or organic solvent, preferably distilled water, while the carbon-based support, e.g. the $MWCNT_{ox}$, is separately dispersed in an aqueous solvent, preferably distilled water, in order to pre-fill the inner channels of the carbon-based support. Preferably the solution of the manganese oxide precursor is an aqueous solution of a Mn(+II) salt, which is preferably a aqueous solution of $MnCO_3$, and more preferably an aqueous solution of $Mn(NO_3)_2$. Subsequently, the suspension of the carbon-based support is added to the manganese oxide precursor solution under stirring. Capillary actions and diffusion processes serve to impregnate the outer and inner surface of the carbon-based support, preferably the $MWCNT_{ox}$. Specifically, the volume of the manganese oxide precursor solution is adjusted to the pore volume of the carbon-based support, so that it is sufficient to completely fill the pores of the carbon-based support. The impregnation method, and particularly the incipient wetness impregnation method lead typically to a homogenous metal deposition of extremely small particles.

In case of using a Mn(+II) salt precursor solution, the as-prepared composite material consists exclusively of $Mn^{+2}$ which is expected by an impregnation with a Mn(+II) salt solution.

Subsequently, the impregnated carbon-based support is preferably washed, dried and calcinated as described herein below. In case of using a $MnO_x$ precursor and an oxidized MWCNT, the resulting product is referred to as i-$MnO_x$/$MWCNT_{ox}$.

Optionally, the product obtained by the impregnation method, such as i-$MnO_x$/$MWCNT_{ox}$ may be post-treated by a step of heating at a temperature in the range of 350-450° C., preferably at 400° C. in order to gradually increase the oxidation state of the initial Mn(+II), i.e. as prepared, to a mixture of Mn(+II)/Mn(+III) oxides at 400° C.

Symproportionation Precipitation

As an alternative to the impregnation method, a symproportionation precipitation step may be employed in the present invention. Hence, the present invention employs either the impregnation step or the symproportionation precipitation step.

Similarly to the impregnation method, the manganese oxide precursor, is dissolved in an aqueous solvent, preferably distilled water, while the carbon-based support, e.g. the $MWCNT_{ox}$, is separately dispersed in an aqueous solvent, preferably in distilled water. Preferably the solution of the manganese oxide precursor is an aqueous solution of a Mn(+II) salt, which is preferably a aqueous solution of $MnCO_3$, and more preferably an aqueous solution of $Mn(NO_3)_2$. Next, the pH of the solution of manganese oxide precursor is preferably adjusted to a range of pH 7-9, preferably to a pH=8, and subsequently, the suspension of the carbon-based support is added to the manganese oxide precursor solution to obtain a carbon-based support/manganese oxide precursor mixture. Finally, a symproportionation agent is added in stoichiometric amounts to the mixture, while keeping the pH of the mixture constant. In case of a Mn(+II) salt precursor, the symproportionation agent is preferably a Mn(+VII) salt, e.g. $KMnO_4$. The mixture is stirred at room temperature for 1-3 hours, preferably for 2 hours to allow the Mn(+II) salt precursor to react with the Mn(+VII) salt as follows

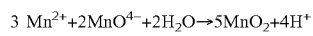
$$3\,Mn^{2+}+2MnO^{4-}+2H_2O \rightarrow 5MnO_2+4H^+$$

The obtained $MnO_2$ precipitates onto the carbon-based support surface completing the symproportionation precipitation reaction. Accordingly, the as-prepared composite material consists exclusively of $Mn^{+4}$ which is expected by a symproportionation reaction of a Mn(+II) salt with a Mn(+VII) salt.

Subsequently, the composite is preferably washed, dried and calcinated as described herein below. In case of using a $MnO_x$ precursor and an oxidized MWCNT, the resulting product is referred to as s-$MnO_x$/$MWCNT_{ox}$.

Washing and Drying

The obtained product of either the impregnation method or the symproportionation precipitation method may be washed, preferably with distilled water until the conductivity of the filtrate is below 1.0 mS/cm, preferably below 0.5 mS/cm.

The obtained composite is preferably dried, such as by drying in air, which drying may contribute to an improved dispersion of the nanoparticular manganese oxide precursor, and may optionally contribute to an improved dispersion of the symproportionation product, deposited onto the carbon-based support surface.

Without wishing to be bound by theory, if the obtained composite is dried at low temperatures, i.e. temperatures which are below the dehydration temperature of the manganese oxide precursor and optionally below the dehydration temperature of the symproportionation agent, the precursor structure, and optionally the structure of the symproportionation agent, is preserved and wets and spreads over the surface of the carbon-based support. CNTs were shown to have a critical surface tension of ~180 mN m$^{-1}$, which allows most compounds to wet their surface. In contrast, if dehydration of the manganese precursor, and optionally of the symproportionation agent, occurs during the drying, e.g. at temperature ranges from 60-70° C., the efficiency and homogeneity of the impregnation and optionally the precipitation depends on the specific chemistry of the transition metal and on the mobility of the complexes which are formed during the decomposition of these precursors. It was shown that the precursor interacts and eventually reacts with the OH groups of the support, thus leading to chemically anchored metal oxide species.

Hence, the preferred low-temperature drying of the obtained composite may improve the dispersion and homogeneity of the nanoparticular manganese oxide deposited on the carbon-based support and may be particularly suited for the impregnation method.

Accordingly, the present invention preferably employs a step of low-temperature drying which is characterized by non-dehydrating conditions of the precursors. Specifically, the low-temperature drying is preferably carried out at a temperature of below 100° C., preferably 20-80° C., more preferably 40-60° C. and most preferably at 60° C. The low-temperature drying time period ranges preferably from 1 to 48 hours, more preferably from 4 to 24 hours, even more preferably from 6 to 16 hours, and still more preferably from 6 to 12 hours. Specifically, preferred low-temperature drying conditions are as follows: (i) at 20-80° C. over a time period of 6-16 hours or 6-12 hours, more preferably (ii) at 40-60° C. over a time period of 6-16 hours or 6-12 hours, and most preferably (iii) at 60° C. over a time period of 6-16 hours or 6-12 hours.

Optionally, the present low-temperature drying step may be combined with a second high-temperature drying step which is characterized by dehydrating conditions of the precursors, preferably without altering their oxidation state. Specifically, at a temperature above 100° C., e.g. at 100-120° C., preferably at 110° C. to constitute a two-step drying process. The second high-temperature drying step serves to favor the dehydration of the manganese oxide precursor(s) as well as its reaction with the OH groups present on the surface of carbon-based supported, e.g. present on the surface of the oxidized CNTs. Hence, the second high-temperature drying step ensures a complete removal of moisture present in the composite prior to its calcination. Similarly to the low-temperature drying step, the high-temperature drying time period ranges preferably from 1 to 48 hours, more preferably from 4 to 24 hours, even more preferably from 6 to 16 hours, and still more preferably from 6 to 12 hours.

Calcination

Finally, the present invention preferably employs a step of calcinating the dried composite or the optionally washed composite without performing an additional drying step before calcinating. The calcination is preferably carried out in an oxygen atmosphere and serves to adjust the oxidation state of the deposited nanoparticular manganese oxide. Besides the employed manganese oxide deposition method, i.e. the above-mentioned impregnation method or the symproporationation precipitation method, the applied calcination conditions determined the electrochemical properties, and in particular the oxidation state, of the nanoparticular manganese oxide deposited on the carbon-based support. Specifically, the oxidation state of Mn by calcination is a function of oxygen partial pressure and temperature. The dependency between these electrochemical properties of Mn and the calcination conditions will be apparent in view the discussion below in and view of the Examples of the application. Preferably, the calcination temperature ranges from 100-500° C., preferably from 150-450° C., more preferably 250-450° C., and even more preferable from 300-400° C. and most preferably at 300° C. Typical calcination time periods range from 0.5 hours to 6 hours.

Characterization of the Composite

The present composite is characterized by comprising a carbon-based support and a manganese oxide deposited thereon.

The term "manganese oxide" ($MnO_x$) refers to manganese oxides with oxidation states +II (MnO, NaCl structure type), +II/+III ($Mn_3O_4$, tetragonally distorted or cubic spinel type), +III ($Mn_2O_3$, three polymorphs), and +IV ($MnO_2$, several polymorphs). Moreover, the hydroxides $Mn(OH)_2$ and MnOOH are included.

Preferably, the manganese oxide is nanoparticular, wherein the term "nanoparticlular" refers to particles having a diameter of their largest projection area in the nanometer range, i.e. being from 1-100 nm. Specifically, the nanoparticular manganese oxide has preferably a particle size of 1-50 nm, more preferably 5-10 nm and more preferably 5 nm, as determined by transition electron microscope (TEM) micrographs.

Moreover, the manganese oxide is preferably homogenously dispersed on the carbon support surface. Accordingly, the distribution of the manganese oxide particles deposited on the accessible carbon-based support surface does not show large variations in the local concentrations. Specifically, such local concentration of deposited manganese oxide may vary by 40% or less, preferably 35% or less, and most preferably 20% or less and most preferably by 10% as determined by SEM-EDX studies.

The carbon-based support preferably includes a carbon-nanostructured material, e.g. a carbon-nanofiber and/or a carbon-nanotube (CNT). A "nanostructured material" refers to a material with dimensions in the nanometer range, i.e. being from 1-100 nm. Accordingly, at least one dimension of the nanostructured material is less than 100 nm. The CNTs can be single-walled (SWCNT), double-walled CNTs (DW-CNT) or multi-walled CNTs (MWCNT). A single-walled CNT can be defined by a cylindrical sheet with a diameter of 0.5-20 nm, whereas the CNTs may have a length of several micrometer.

Moreover, the present composite is preferably characterized by a reduced load of manganese oxide particles onto the carbon-based support. Specifically, the weight ratio of manganese oxide to carbon-based support in the composite is preferably 1-10 wt.-%, more preferably 4.5-7 wt.-%, even more preferably 5-6.5 wt.-% and most preferably 5 wt.-%.

Next, the present composite is preferably characterized by a high surface area. Specifically, the composite has a BET surface area of 200-400 m²/g, and preferably 300-350 m²/g as determined by $N_2$ physisorption.

The composite prepared by the method including the impregnation step, e.g. the i-$MnO_x$/CNT, results initially in a Mn(+II) oxide composite. Upon heating such a composite to 400° C. the oxidation sate gradually increase up to a value of 2.65 which corresponds to a mixture of a Mn(+II)/(+III) oxide, e.g. $Mn_3O_4$ (Hausmannite) composite.

The composite prepared by the method including the symproportionation step, e.g. the s-$MnO_x$/CNT, results initially in a Mn(+IV) oxide composite. Upon heating such a composite to 400° C. the oxidation state is reduced to a value of 3.5 which corresponds to a mixture of a Mn(+III)/(+IV) oxide, e.g. $Mn_3O_4$.

Accordingly, the electrocatalytic properties of the i-$MnO_x$/CNT and the s-$MnO_x$/CNT are different from each other. However, the present composite is characterized by a high electrocatalytic activity under neutral electrolyte conditions as defined above, when comprised in an OER-electrode in the electrolytic splitting of water. In particular, the activity of the present composite significantly exceeds the catalytic activity of Pt. Specifically, the present composite is characterized by a 190 mV lower overpotential measured at 2 mA cm$^{-2}$ when comprised in an OER-electrode for the electrolytic splitting of water under neutral electrolyte conditions. Specific overpotentials achieved by the present composite are illustrated in the Examples of the application.

Therefore, the present invention provides a process for the electrolytic splitting of water under neutral electrolyte by employing and OER-electrode comprising the present composite obtainable by the present method which electrolytic splitting of water achieves an electrocatalytic efficiency (overpotential) which is comparable to the electrodeposited $MnO_x$ films under highly alkaline electrolyte condition. Consequently, the present process for the electrolytic splitting of water can be used for the electrolytic splitting of waste water, seawater and/or freshwater under neutral pH conditions with an improved efficiency.

EXAMPLES

Figure 1:
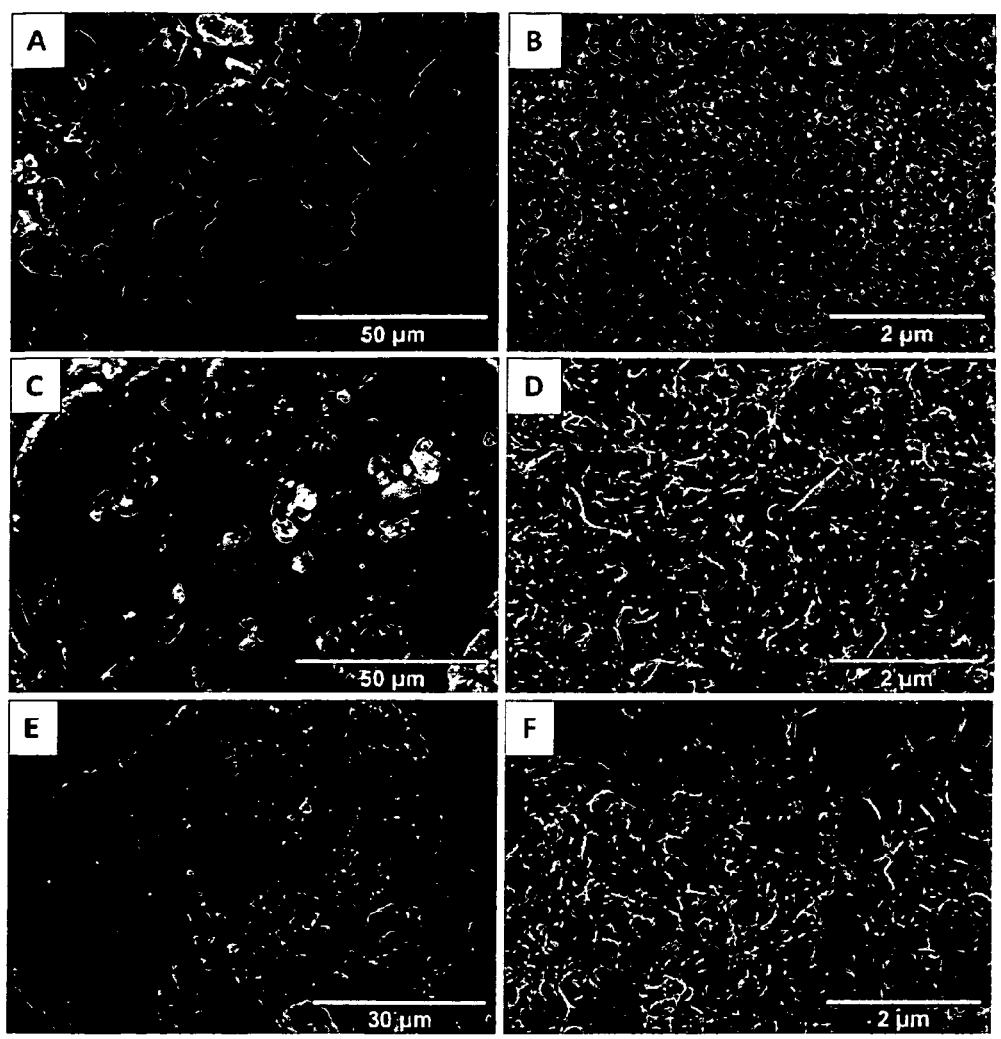
FIG. 1: SEM micrographs of s-$MnO_x$ (A) and (B), s-$MnO_x$/MWCNT$_{ox}$ (C) and (D), and i-$MnO_x$/MWCNT$_{ox}$ (E) and (F).

In the following the invention and its beneficial effects is further described by means of Examples and Comparative Examples. Specifically, the characteristics of an i-MnO$_x$/CNT composite and an s-MnO$_x$/CNT composite are compared vis-à-vis an unsupported s-MnO$_x$ material and vis-à-vis i-[???] MnO$_x$/SBA-15 being silica-supported MnO$_x$ samples.

Sample Preparation

Preparation of an Unsupported s-MnO$_x$ Reference Sample

An unsupported manganese oxide reference sample was prepared by a symproportionation reaction in alkaline media. The pH of a 100 ml solution of 0.015 M manganese (II) nitrate tetrahydrate (Mn(NO$_3$)$_2$.4H$_2$O, Merck) and 0.09 M NH$_4$Cl was adjusted to 8.0 with ammonia. 100 ml of a 0.01 M potassium permanganate (KMnO$_4$, Carl Roth) solution were added dropwise. The pH of the solution was kept constant at 8.0 with NH$_3$. After filling up the volume to 500 ml with distilled water the solution was stirred for 2 hours. Subsequently, the precipitate was filtered and washed with distilled water until the conductivity of the filtrate was <0.5 mS/cm. The product was dried for 16 h at 110° C. in air followed by calcination in air at various temperatures to form the manganese oxide (s-MnO$_x$).

Functionalization of Carbon Nano-Tubes (CNTs)

Multiwalled carbon nanotubes (MWCNTs) were supplied by Bayer MaterialScience AG Germany (Baytubes, >95% C, outer diameter 15 nm). Their initial specific surface area, measured by N$_2$ adsorption (BET) is 291 m$^2$/g. The pristine Baytubes were treated with concentrated nitric acid (65% HNO$_3$, 500 ml for 10 g CNTs) under vigorous magnetic stirring at 100° C. for 16 h, in order to remove the residual growth catalyst and amorphous carbon impurities and to functionalize the nanotube inner and outer surfaces by oxidation. After cooling down to room temperature, the suspension was filtered and extensively rinsed with distilled water until reaching a neutral pH of the filtrate. The product (MWCNT$_{ox}$) was dried at 110° C. over night. The specific surface area increased from 291 to 316 m$^2$/g after a 16 h treatment at 100° C., most probably because part of the inner walls, which blocked the inner channel, were oxidized.

Preparation s-MnO$_x$/MWCNT$_{ox}$ Sample

For the symproportionation precipitation sample, the pH of a 100 ml solution of 0.015 M manganese(II) nitrate tetrahydrate (Mn(NO$_3$)$_2$×4H$_2$O, Merck) and 0.09 M NH$_4$Cl was adjusted to 8.0 with ammonia. For example, for a 10 wt % loading of Mn on MWCNT, 1.373 g of the oxidized CNTs (MWCNT$_{ox}$) as prepared above were first dispersed in 200 ml distilled water and treated with ultrasound for a few seconds to improve dispersion. The CNT suspension was then slowly added to the Mn(NO$_3$)$_2$ solution under vigorous stirring. Finally, 100 ml of a 0.01 M potassium permanganate (KMnO$_4$, ROTH) solution were added dropwise. The pH of the dispersion was kept constant at 8.0 with NH$_3$ throughout the synthesis. After filling up the volume to 500 ml with distilled water, the solution was stirred for 2 hours at room temperature in order to allow MnO$_4^-$ to react with Mn$^{2+}$. Subsequently, the solid was filtered and washed with distilled water until the conductivity of the filtrate was <0.5 mS/cm. The product was dried for 16 h at 110° C. in air followed by calcination in air at various temperatures to form the MWCNT-supported manganese oxide particles (s-MnO$_x$/MWCNT$_{ox}$).

Preparation i-MnO$_x$/MWCNT$_{ox}$ Samples

For the incipient wetness impregnation sample, 0.5 g of the oxidized CNTs (MWCNT$_{ox}$) as prepared above were first impregnated with 3 ml of distilled water in order to fill the inner channel of the CNTs and have the Mn deposition occur preferentially on the outer surface, similarly to the sample prepared by symproportionation. Two samples with a nominal loading of 5 and 10 wt.-% have been prepared by incipient wetness. For the 5 wt.-% MnO$_x$/CNT sample prepared, 114 mg of manganese(II) nitrate tetrahydrate (Mn(NO$_3$)$_2$.4H$_2$O, Merck) were dissolved in 1 ml of distilled water. The solution was then slowly added to the wet MWCNTs while continuously stirring the paste. The mixture was dried at 60° C. for 6 h and 110° C. for 24 h in air. Then, it was calcinated in air at different temperatures in order to decompose the manganese precursor and form MWCNT-supported manganese oxide particles (i-MnO$_x$/MWCNT$_{ox}$). The same procedure was applied for the 10 wt.-% MnO$_x$/CNT sample.

Measurement Methods and Measurement Conditions

The X-ray powder diffraction (XRD) measurements were performed with a STOE STADI-P transmission diffractometer equipped with a focusing primary Ge(111) monochromator and a 3° linear position sensitive detector (PSD) using Cu Kα radiation. The powder samples were fixed with small amounts of X-ray amorphous grease between two thin films of polyacetate foil.

The concentration of manganese and the presence of metal impurities from the remaining catalyst were examined by wavelength dispersive X-ray fluorescence (WDXRF) using a Bruker AXS S4 PIONEER spectrometer. For this purpose, 0.5 g of sample was placed in a polystyrene holder (Ø 34 mm) and covered with a 4 μm thick polypropylene film.

Specific surface areas of the calcined material and the precursors were carried out by $N_2$ physisorption (Quantachrome Autosorb-1) and evaluated using the BET method. The samples were outgassed for 4 h at 100° C. Pore size distributions were determined from the desorption branches of the isotherms using the BJH method.

The thermogravimetric analysis (TGA) and evolved gas analysis (EGA) of the decomposition reaction were achieved with a NETZSCH STA449 thermobalance under controlled gas flow (21% $O_2$ in Ar, 100 ml/min) connected to a quadrupole mass spectrometer (QMS200 OMNISTAR, Balzers). The measurements were performed with approximately 15 mg sample in a temperature range of 30-700° C. (2 Kpm).

Temperature-programmed reduction (TPR) of the samples was performed in a fixed bed reactor (TPDRO-1100, CE Instruments) in 5% $H_2$/Ar (80 ml/min), with a heating rate of 6 Kpm, in a quartz tube. The $H_2$ consumption was monitored with a thermal conductivity detector (TCD). The TCD detector was calibrated by reducing a known amount of CuO.

For morphological studies of the materials, SEM images were acquired with a Hitachi S-4800 scanning electron microscope equipped with a field emission gun. The samples were loosely dispersed on conductive carbon tape (Plano). The SEM was operated at low accelerating voltage (1.5 kV) for a better resolution of the surface features of the samples. Elemental analysis by X-ray energy dispersive spectroscopy (EDX) was carried out at 15 kV using an EDAX detector connected to the SEM.

The microstructure of the samples was examined using a Philips CM200 transmission electron microscope (TEM) equipped with a field emission gun (FEG). The samples were dispersed in chloroform and deposited on a holey carbon film supported on a copper grid. High-resolution images were taken with a CCD camera, and selected areas were processed to obtain the power spectra (square of the Fourier transform of the image), which were used for measuring inter planar distances and angles for phase identification.

To characterized the CNT support materials after the different deposition processes, Raman spectroscopy was applied at room temperature on a LabRam spectrometer using 633 nm laser excitation from a HeNe laser, with a power of 20 mW at the laser output. All data were obtained with a BX40 Olympus microscope (objective 100). Acquisition times were typically 3·180 s. Prior to the experiments, the Raman spectrometer was calibrated using a Si wafer.

The near-edge X-ray absorption fine structure spectra (NEXAFS) were measured at the ISISS beamline at the BESSY II synchrotron facility of the Helmholtz-Zentrum Berlin (Germany) in the end station of the FHI-MPG. The beamline was operated with 60 μm exit slit. The Total Electron Yield (TEY) spectra were obtained in continuous driving mode of the monochromator (CMM) (0.178 eV/s). For the detection of the Mn $L_{3,2}$-edges (transition from Mn2p core level to unoccupied Mn3d state) an energy region of 660-633 eV were measured. The measurements were performed in vacuum and in $O_2$ with a partial pressure of 0.5 mbar (s-$MnO_x$) and 0.25 mbar (s-$MnO_x$/$MWCNT_{ox}$, i-$MnO_x$/$MWCNT_{ox}$), while heated with a constant rate (6 Kpm) from 25 up to 550 K. The NEXAFS data were collected at room temperature, after each incremental increase in temperature of 50-100° C. and at the final temperature. The spectra were intensity normalized to unity at 648 eV and analyzed by fitting them with a linear combination of spectra representing $Mn^{2+}$, $Mn^{3+}$ and $Mn^{4+}$ single valence sites. The WinXAS software package was used for data evaluation. All experimental spectra could be described reasonably well as a superposition of these three components, which have been extracted from the data set under the assumption, that pure $Mn^{2+}$ is present in the sample impregnated with $Mn(NO_3)_2$, $Mn^{3+}$ is formed upon oxidation of this sample and that no $Mn^{2+}$ is present after heating the symproportionated sample to 400° C. in oxygen. The resulting reference spectra are compared to those of reference Mn-oxide materials MnO and $MnO_2$ and a reasonable agreement was found. Using these reference materials themselves for fitting the NEXAFS spectra, however, resulted in significantly poorer agreement, which can be explained by the contribution of the local geometry to the spectrum, which varies in different polymorphs of Mn-oxides and may not be representative for the prepared materials. This has also been observed in studies of other mixed valence systems. X-ray photoemission spectra were recorded at the same beamline.

For the sample s-$MnO_x$/$MWCNT_{ox}$, the Mn K-edge X-ray absorption near edge structure was measured at HASYLAB (Hamburg, Germany) at the X1 beamline in the transmission mode. The energy scale was calibrated using a Mn metal foil with an edge position at 6539 eV. The edge region was evaluated using WinXAS by comparing the positions of the edge features on the energy scale to literature data. The edge position was determined by fitting a modified atan step-function to the near-edge region. In this work, the acronym NEXAFS is used for spectra recorded with surface-sensitive soft X-ray measurements at the Mn L-edge, while the bulk-sensitive hard X-ray measurements at the Mn K-edge are termed XANES.

Carbon-supported s-$MnO_x$ and i-$MnO_x$ with an effective loading of 6.4 and 6.1 wt.-%, respectively (dried at 110° C.) have been tested for electrocatalytic activity and stability.

Electrocatalytic measurements were conducted using a 3-electrode/electrolyte compartment. Pt gauze and a commercial reversible hydrogen electrode (RHE) was used as counter and reference electrode, respectively. 0.1 M potassium phosphate buffer (pH 7) was employed as an electrolyte. Catalyst inks were prepared by mixing 5 mg catalyst with 1.99 ml distilled water, 500 μl isopropanol and 10 μl of Nafion solution (5 wt %, Aldrich), followed by homogenization with a hornsonicator (5 W, 15 min) in a water bath. The catalyst ink (10 μl) was dispersed onto glassy carbon electrodes (Ø 5 mm, 0.196 $m^2$) and dried at 60° C. in air. The glassy carbon electrodes and Pt cylinder (Ø 5 mm, 0.196 $m^2$) were polished and cleaned stepwise in ultrasonic bath using water and acetone before usage. Preceding the electrochemical measurements, the electrolyte was de-aerated with $N_2$ for at least 15 min before switching to a $N_2$ blanketing flow during measurement. OER activities were measured using anodic linear sweep voltammetry between 1.0 and 2.0 V vs. RHE with a sweep rate of 6 mV/s. All potentials were IR-corrected after measurements using electrochemical impedance spectroscopy. Electrochemical stability was tested by cycling the electrode potential 20 times in the mentioned potential range with a sweep rate of 100 mV $s^{-1}$. All potentials are referred to the reversible hydrogen electrode.

Experimental Results
s-MnO$_x$ Sample

SEM images of s-MnO$_x$ after drying at 110° C. are shown in FIG. 1-A, B. It can be seen that very small particles of dimensions in the 10 nm-range form larger aggregates exhibiting a high porosity. SEM-EDX analysis shows that the Mn:O ratio is between 0.6 and 0.73, thus too high for the target MnO$_2$ compound. The BET-specific surface area was 232 m$^2$/g, which is relatively high for a transition metal oxide.

Figure 2:
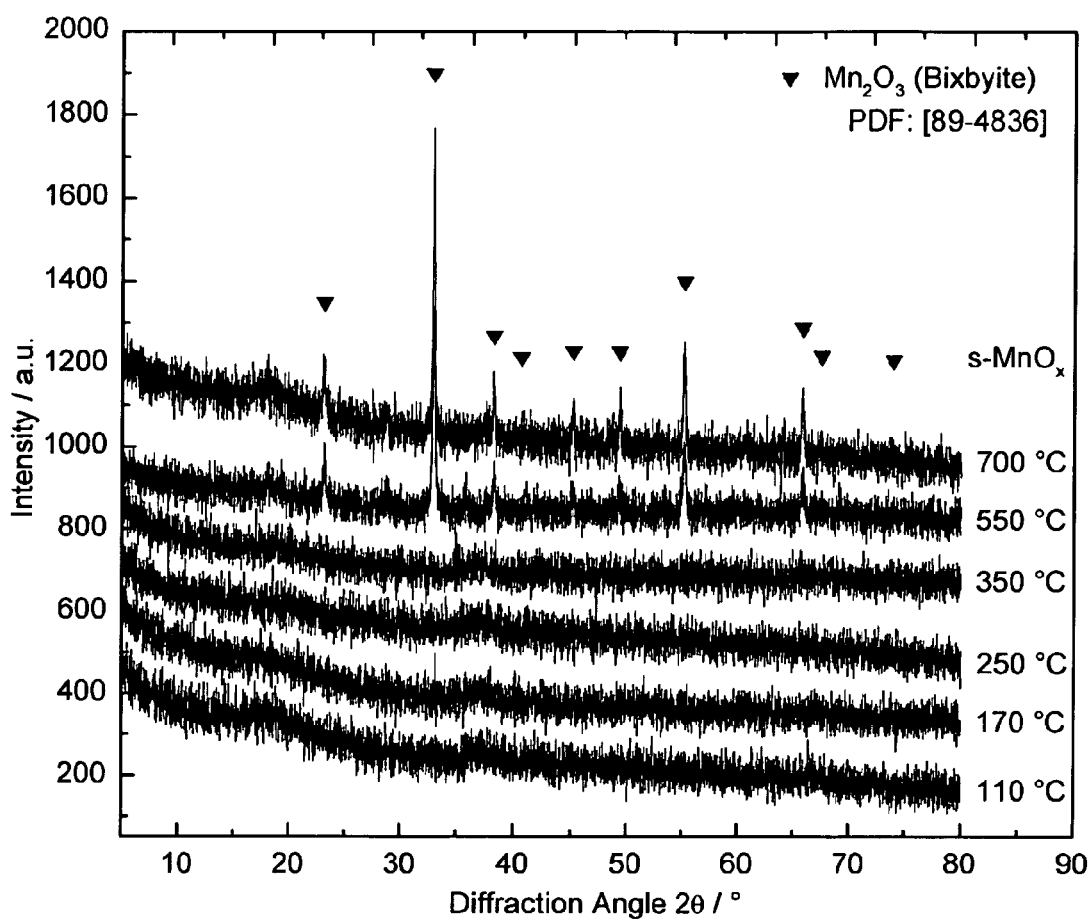
FIG. 2: XRD patterns of the symproportionation precursor s-$MnO_x$ after calcination at different temperatures, i.e. 110° C., 170° C., 250° C., 350° C., 550° C. and 700° C. from lower to upper pattern, and after heating to 700° C. during TGA. The final product can be identified as $Mn_2O_3$ (Bixbyite, black triangles).

The dried precipitate was calcined at different temperatures, the XRD patterns of the resulting samples are presented as FIG. 2 together with the XRD pattern of the sample after heating to 700° C. in the thermobalance. Oxide phases do not crystallize until the calcination temperature has reached 550° C. The appearing reflections can be assigned to Mn$_2$O$_3$ (Bixbyite, JCPDS 89-4836), in agreement with the temperature range of the transformation of MnO$_2$ to Mn$_2$O$_3$. Calcination below this temperature yields X-ray amorphous samples.

Figure 3:
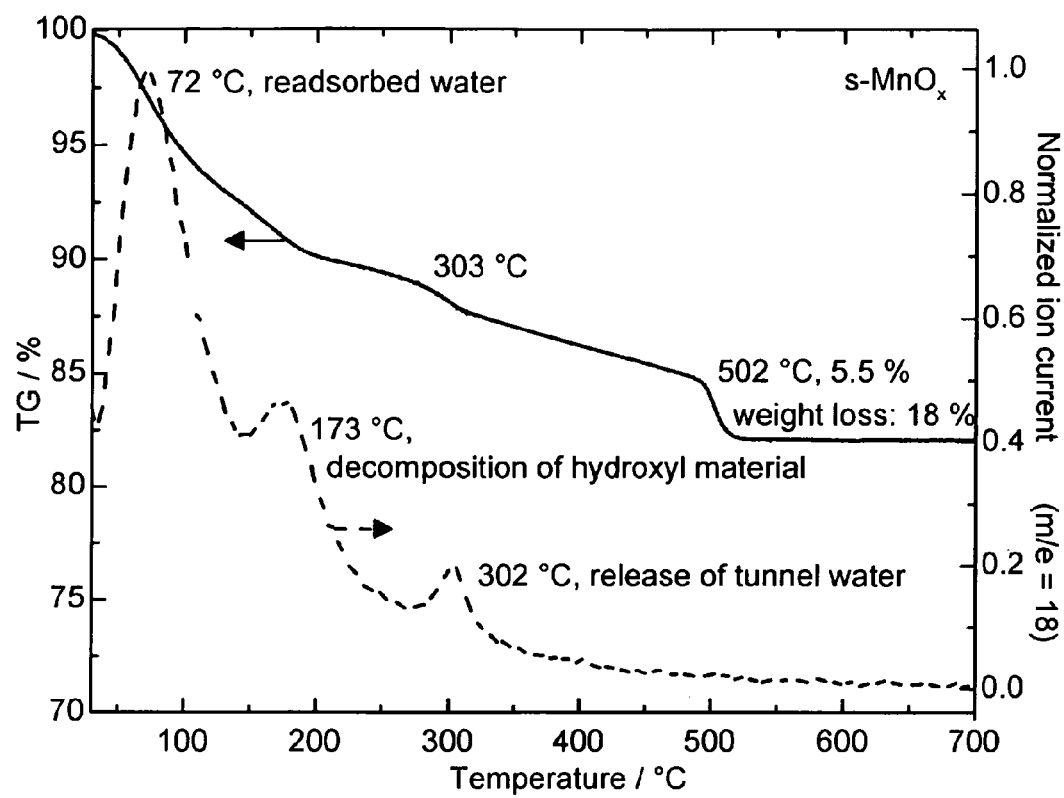
FIG. 3: TG-MS curves for the thermal decomposition of manganese oxide (s-$MnO_x$) in air.

Simulation of the calcination by thermogravimetric measurements in synthetic air coupled with mass spectrometry is shown in FIG. 3. The thermal decomposition can be divided into four major steps. Initially, at temperatures below the drying temperature of 110° C. an MS signal at m/e=18 indicated emission of weakly bonded re-absorbed water molecules. The next dehydration peak at 173° C. is assigned to the decomposition of hydroxyl groups. The small dehydration peak centered at 303° C. is assigned to emission of water, located in the (2×2) channels of α-MnO$_2$, which was reported to occur near 300° C. According to the TGA data, all hydroxyl groups can be assumed as decomposed at 303° C. The mass loss observed at 502° C. is assigned to the oxygen loss due to the conversion of MnO$_2$ to Mn$_2$O$_3$, in agreement with the XRD results. The total weight loss up to 700° C. is 18 wt %. Assuming that at temperatures above 502° C. pure Mn$_2$O$_3$ is present, which evolved entirely from MnO$_2$, the calculated mass difference to the state after dehydration at 303° C. should be twice as high, than the experimentally determined difference of just 5.5%. This indicates that part of the manganese has been in a lower oxidation state than IV from the beginning.

Figure 4:
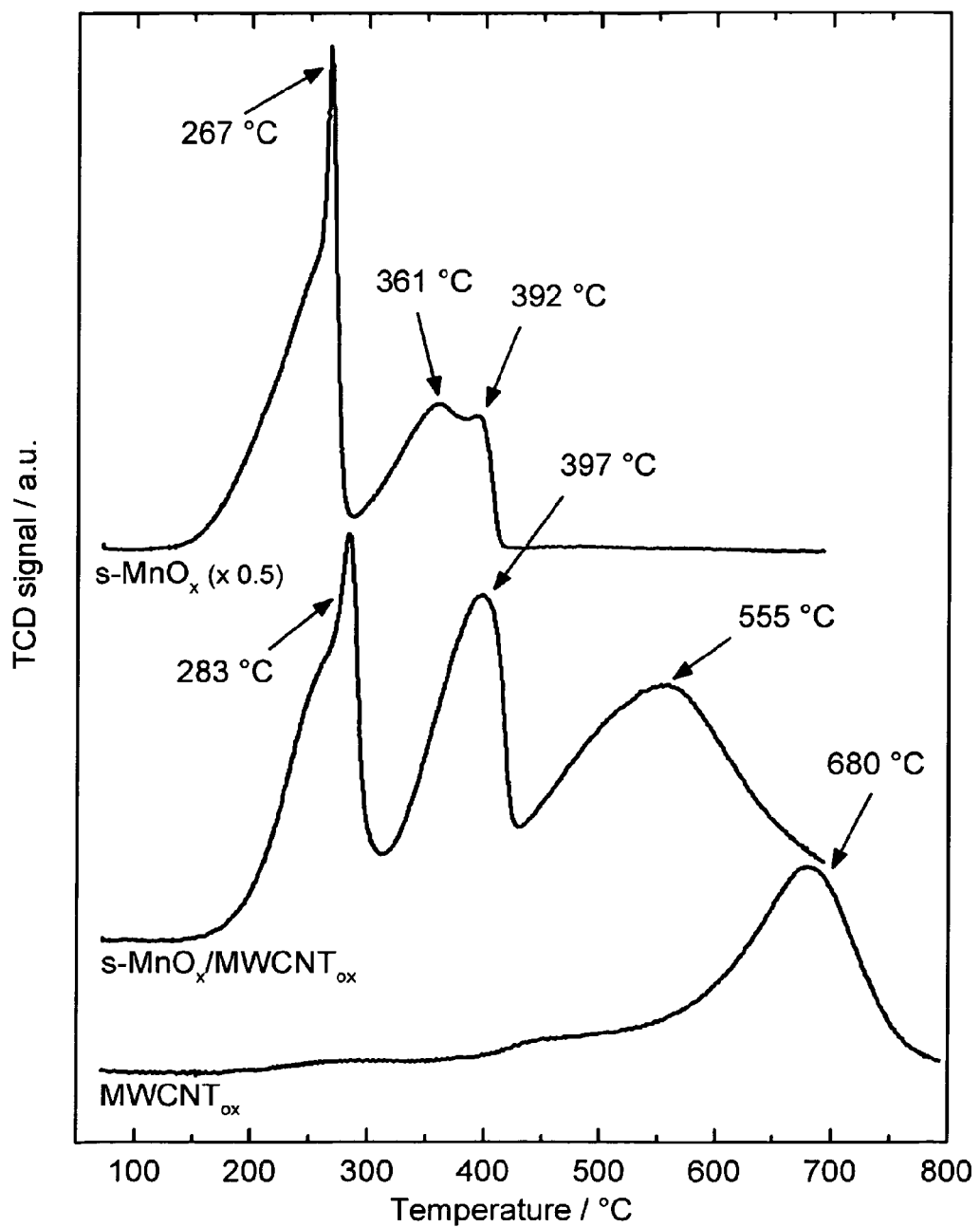
FIG. 4: TPR profiles of s-$MnO_x$ (19.0 mg) (upper signal), s-$MnO_x$/MWCNT$_{ox}$ (124.8 mg) (middle signal) and MWCNT$_{ox}$ (111.5 mg) (lower signal).

The TPR profile of the sample calcinated for 2 h at 170° C., in which the majority of the OH-groups should be decomposed, is shown in FIG. 4. The TPR profile shows two structured peaks occurring below and above approximately 380° C. The low temperature peak has an early onset near 150° C., a shoulder to the low temperature side and a narrow peak at 267° C. The presence of nanoparticles of manganese oxide in the sample may cause the low onset and the shoulder as dispersed manganese oxide is more easily reduced than bigger particles. The first peak can be assigned to the reduction of Mn$^{4+}$ to Mn$^{3+}$ (MnO$_2$ to Mn$_2$O$_3$). The reduction peak in the temperature range 300-400° C. is a superposition of two reduction steps. The first is assigned to the reduction of Mn$_2$O$_3$ to Mn$_3$O$_4$ and the second to that of Mn$_3$O$_4$ to MnO. The presence of pure MnO after reduction at 700° C. is confirmed by XRD (not shown). Integration of the TPR curve and comparison with the reduction profile of a pure CuO standard reveals that the average oxidation state of manganese in the starting material is Mn$^{3.42+}$ (MnO$_{1.71}$), in agreement with the Mn:O ratio calculated from the EDX spectra.

Figure 5:
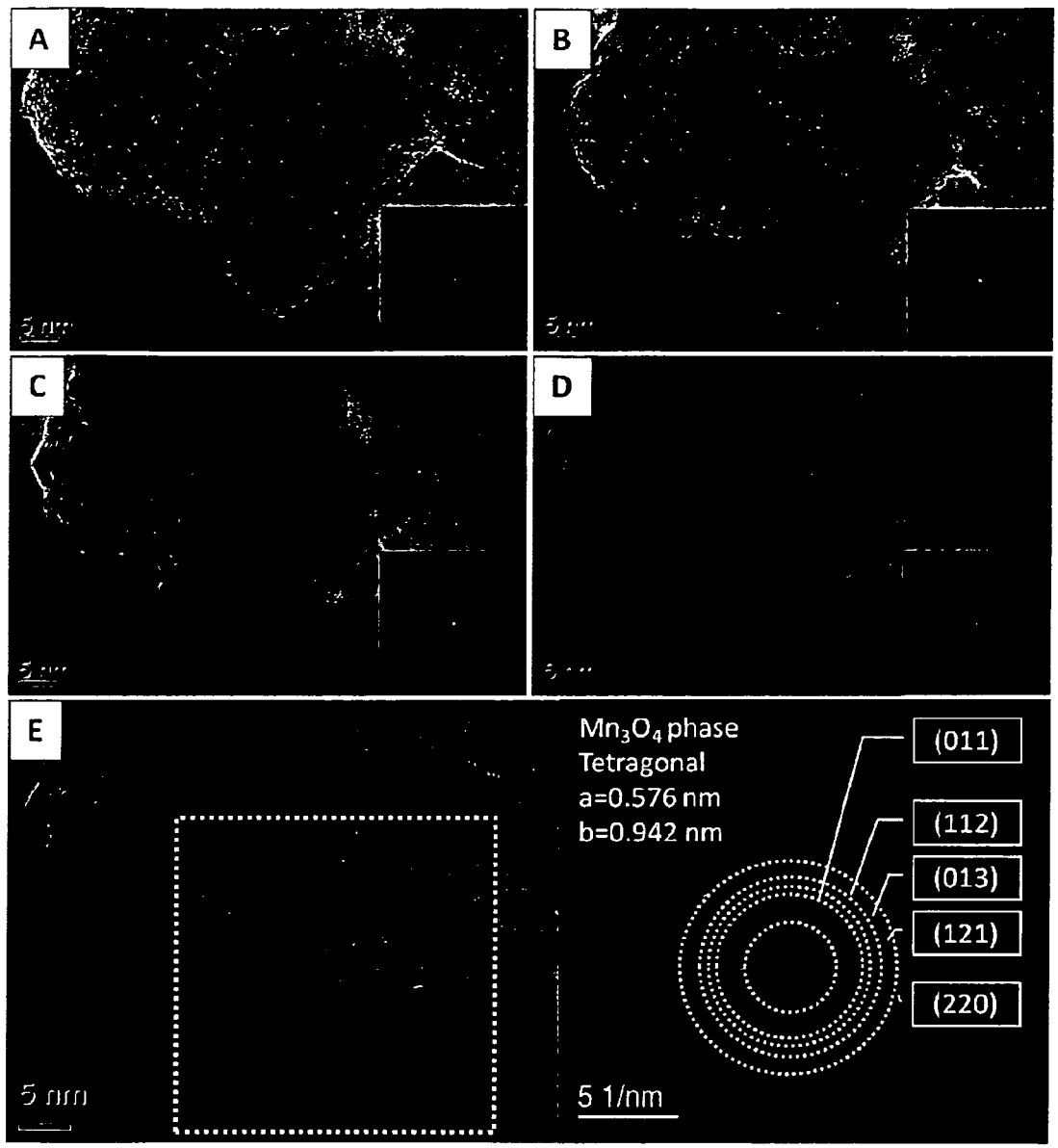
FIG. 5: TEM images of the manganese oxide sample (s-$MnO_x$) under the electron beam; at the beginning (A), after 2 minutes (B), after 13 minutes (C), after 26 minutes (D) and the corresponding Fourier transform (E).

Further characterization of the dried sample was attempted by transmission electron microscopy investigations. The s-MnO$_x$ sample consists of an amorphous material. The TEM micrographs in FIG. 5 show, that under the reducing conditions of prolonged electron beam irradiation the material slowly crystallizes. After 13 minutes (FIG. 5-C) first lattice planes can be observed, which are well pronounced after 26 minutes (FIG. 5-D). The Fourier transform (FFT) of the TEM image after 26 minutes, is shown in FIG. 5-E. The interplanar distances correspond to the (011) (112) (013) (121) and (220) lattice planes of tetragonal α-Mn$_3$O$_4$ (Hausmannite), with lattice constants of a=5.76 Å and c=9.42 Å. However, this result gives hardly any information about the initial oxidation state of the amorphous starting material as not only crystallization but also reduction may have been triggered by the electron beam in the microscope.

In-situ NEXAFS measurements in the total electron yield mode, which are sensitive to near-surface oxidation states, have been performed to characterize the change of the Mn valence in oxidizing conditions, i.e. with heat treatment in oxygen atmosphere. The Mn L-edges (L3-edge around 640-645 eV, L2 at 650-655 eV) show a rich fine structure due to a strong multiplet splitting that is very sensitive to the local chemical environment.

Figure 6:
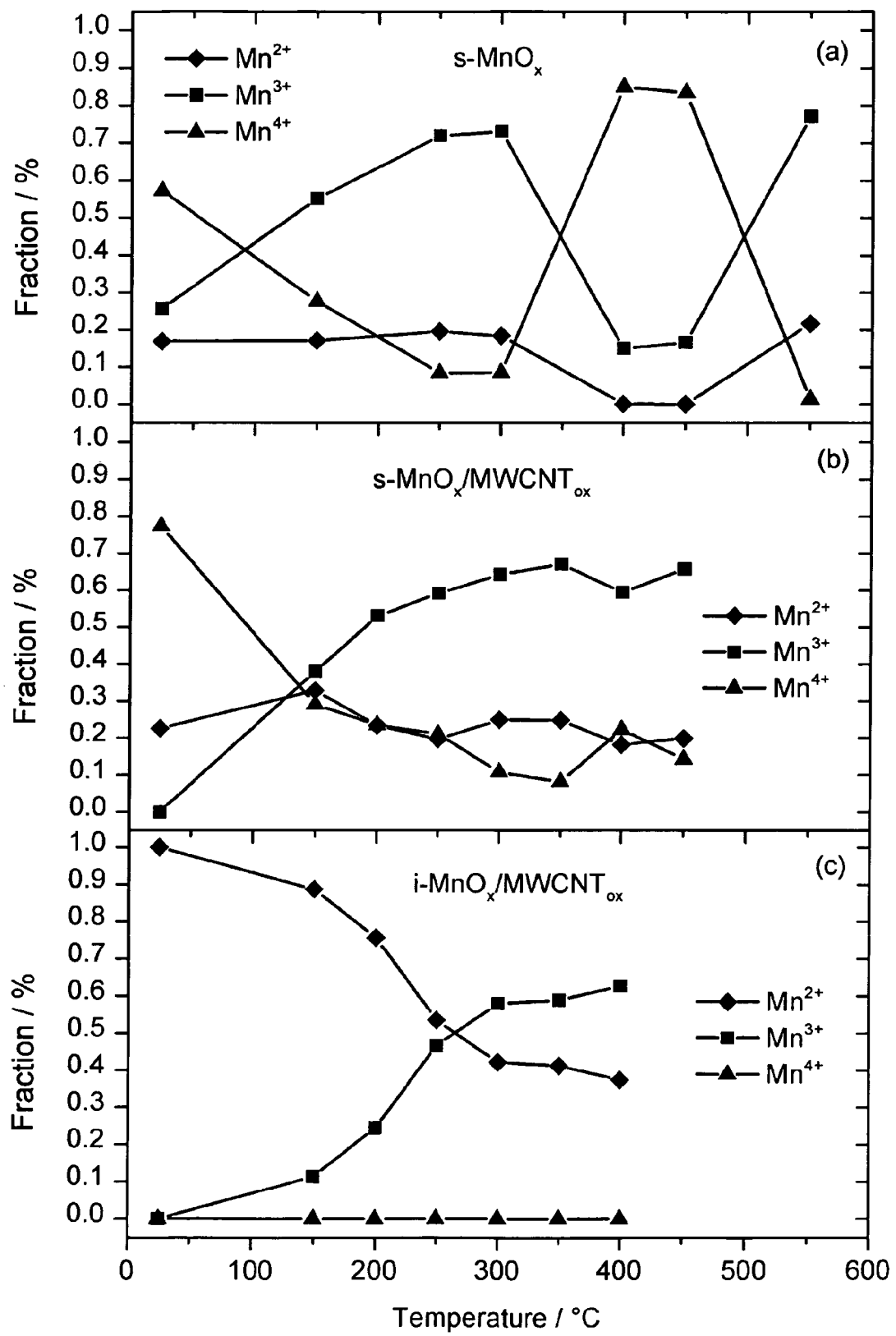
FIG. 6: Evolution of the Mn species with temperature as determined by fitting of the L-NEXAFS spectra of s-$MnO_x$ in 0.5 mbar $O_2$ (a), s-$MnO_x$/MWCNT$_{ox}$ at 0.25 mbar $O_2$ (b), and i-$MnO_x$/MWCNT$_{ox}$ at 0.25 mbar $O_2$ (c). In (a), (b) and (c) is -♦-$Mn^{2+}$; -■- $Mn^{3+}$; -▲- $Mn^{4+}$.
Figure 7:
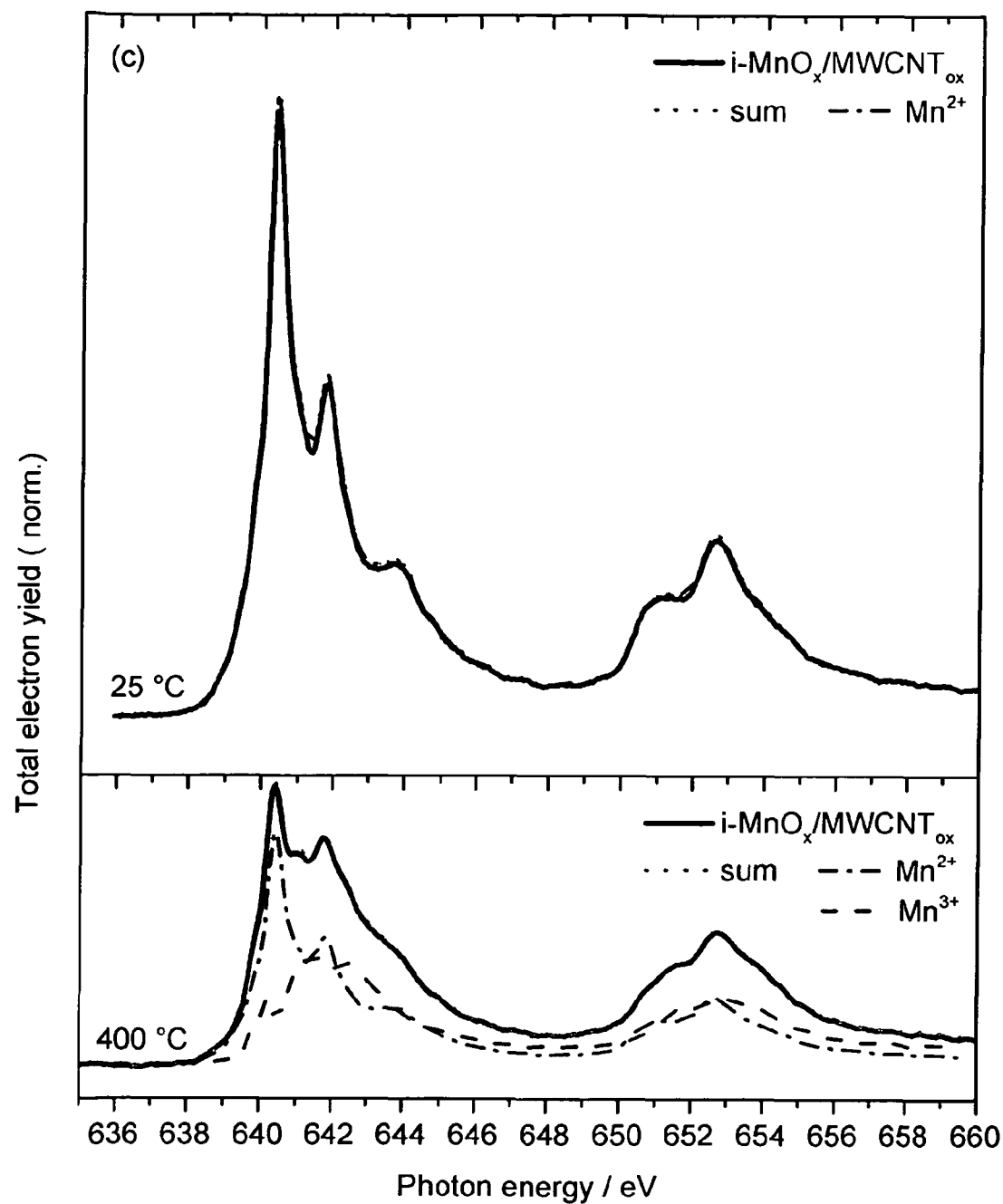
FIG. 7: Mn L-NEXAFS spectra of s-$MnO_x$ in 0.5 mbar $O_2$ (a), s-$MnO_x$/MWCNT$_{ox}$ at 0.25 mbar $O_2$ (b), and i-$MnO_x$/MWCNT$_{ox}$ at 0.25 mbar $O_2$ (c), each at 25° C. (upper spectrum) and 400° C. (lower spectrum). In (a), (b) and (c) is •••• sum; -•- $Mn^{2+}$; - - $Mn^{3+}$ and -••- $Mn^{4+}$.

The evolution of the Mn valence with temperature is shown in FIG. 6(a). FIG. 7(a) presents the experimental and fitted NEXAFS spectra at the Mn L absorption edges of the dried manganese oxide at room temperature and 400° C. in oxygen atmosphere (0.5 mbar). In agreement with the EDX, TG and TPR data, the major component in the as-prepared sample is Mn$^{4+}$, but lower oxidation states are also abundant. From the NEXAFS fit an average Mn oxidation state of a hypothetically homogeneous material of +3.40 can be calculated, which is in good agreement with the TPR data. The Mn$^{4+}$ component decreases with increasing temperature, while the Mn$^{3+}$ component increases. The Mn$^{2+}$ component is relatively stable, which may indicate that Mn$^{2+}$ is not associated to the Mn$^{3+}$ component in a mixed valence compound like Mn$_3$O$_4$, but that it may rather be attributed to a surface termination in a reduced state. Between 300 and 400° C. the average reduction of the material stops after an average valence of +2.90 has been reached at 300° C. Heating in oxygen at 400° C. results again in oxidation with an increase in the Mn$^{4+}$ site fraction reaching an average oxidation state of +3.92. At further heating above 500° C. a reduction to lower oxidation states takes place. At a temperature above 550° C., a mixture of Mn$^{2+}$ and Mn$^{3+}$ is existent with an average oxidation state of +2.80. The formation of crystalline Mn$_3$O$_4$ (Hausmannite, average valence +2.67) at 550° C. is confirmed by XRD (not shown).

In summary, for the sample s-MnO$_x$, it can be concluded that the symproportionation of Mn(II) nitrate and permanganate (VII) solutions under the given conditions yielded an amorphous hydrated manganese oxide with an average oxidation state slightly below IV (MnO$_{1.7}$·n H$_2$O). Despite the absence of a stabilizing support, the particle size of the precipitate is very small while the porosity and specific surface area are high. Upon heating in oxygen, the sample loses water and is first reduced to an average oxidation state near +3, before being oxidized to +4 around 400° C. At higher temperature, thermal reduction takes place and leads to formation of stoichiometric manganese oxides. The reactivity of the material depends on the oxygen partial pressure. In addition, TEM has shown that the material is sensitive towards electron beam irradiation, which makes the material somewhat hard to comprehensively characterize. However, the results obtained in this section will be used as reference for the supported material prepared under analogous conditions in presence of MWCNTs.

s-MnO$_x$/MWCNT$_{ox}$ Sample

A s-MnO$_x$/MWCNT$_{ox}$ sample was prepared with a nominal content of 10.0 wt.-% Mn/C (considering that Mn from both Mn(NO$_3$)$_2$ and KMnO$_4$ will be deposited on the CNTs). However, XRF analysis has shown, that the effective concentration of Mn in the sample amounts to only 6.5±0.5 wt.-% Mn/C. Considering that KMnO$_4$ is a strong oxidizing reagent, we surmise that a fraction did not react with the pre-adsorbed Mn$^{2+}$ ions, but was spent to oxidize defects of carbon, which have not been completely oxidized previously by the HNO$_3$ treatment.

Figure 8:
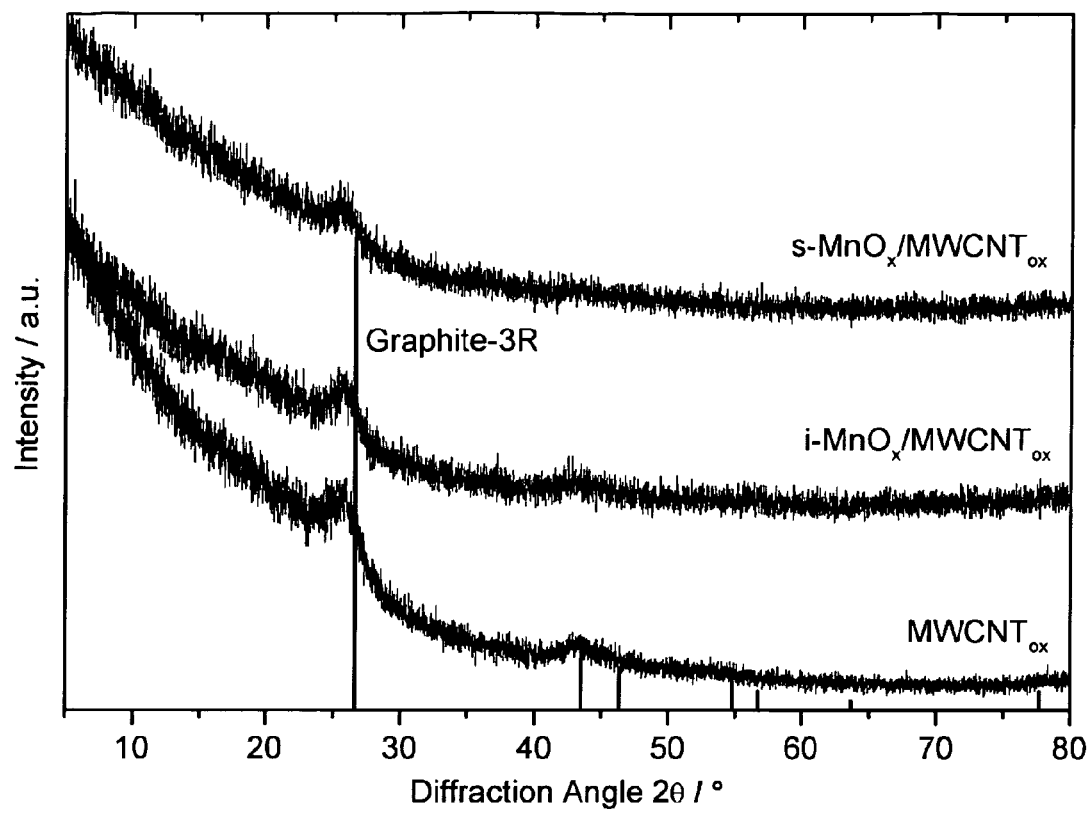
FIG. 8: XRD pattern of the dried MWCNT supported manganese oxides s-$MnO_x$/MWCNT$_{ox}$ (upper pattern) and i-$MnO_x$/MWCNT$_{ox}$ (middle pattern) and oxidized MWCNTs (lower pattern).

The X-ray diffraction pattern of the dried manganese oxide (110° C.), supported on MWCNTs (s-MnO$_x$/MWCNT$_{ox}$) with 6.5 wt.-% Mn/C does not show any sharp peaks (FIG. 8). The intensity bumps at 2θ=25.6 and 43.4° correspond to the graphite of the MWCNT$_{ox}$ walls. As for the unsupported reference sample, reflections of crystalline manganese oxide cannot be observed.

Figure 9:
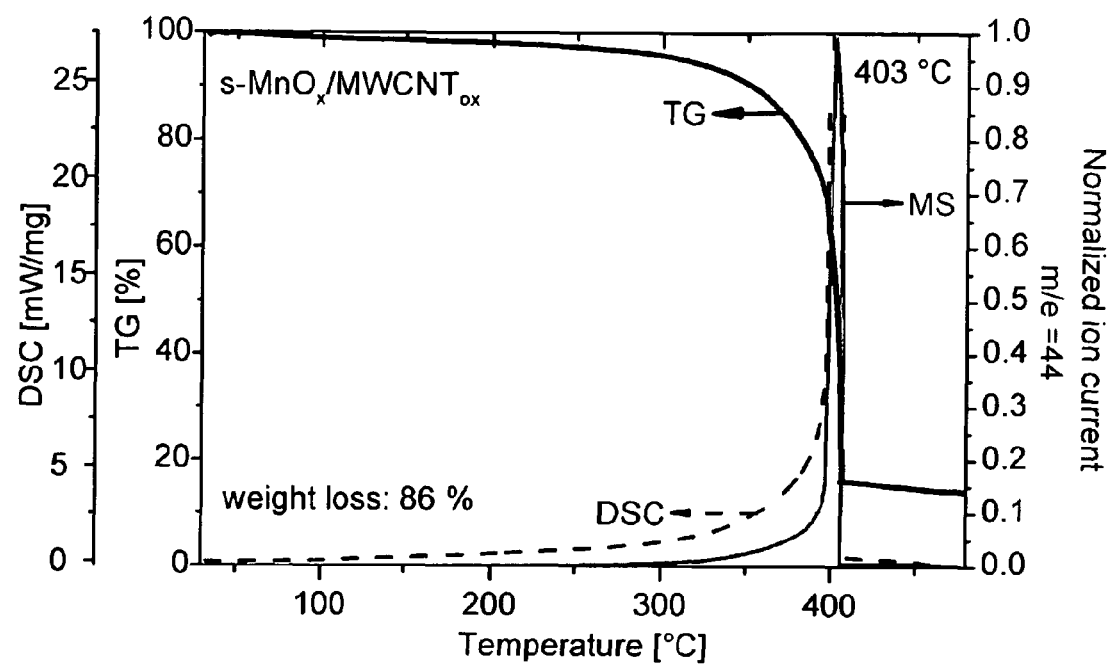
FIG. 9: TG-MS-DSC curves for the thermal decomposition of manganese oxide (s-$MnO_x$/MWCNT$_{ox}$, 6.5 wt % Mn/C) in air.

Calcination of the dried, MWCNT$_{ox}$ supported manganese oxide was simulated by thermogravimetric measurements in synthetic air coupled with mass spectrometry. The resulting curves are shown in FIG. 9. The thermal decomposition shows just one major step. Up to 300° C., no significant weight loss is observed. At 403° C. a strong mass loss is seen, caused by the total oxidation of MWCNT$_{ox}$, identified by the release of large amounts of CO$_2$ and by a sharp exothermic DTA peak. This combustion temperature, i.e. the temperature of the half weight loss in the TG curve, is significantly below the combustion temperature of pure oxidized Baytubes (502° C.), which is attributed to the dispersed Mn oxide phase acting as an oxidation catalyst. The total weight loss up to 480° C. is 86 wt %. From the remaining weight of the ashes, an upper limit of the Mn loading of 8.8 wt % Mn/C can be calculated assuming MnO$_2$ as the decomposition product. This is in reasonable agreement with the concentration determined by XRF analysis.

While the XRD and TGA results are strongly dominated by the carbon support phase, temperature programmed reduction (TPR) allows for characterization of the Mn oxide phase (FIG. 4). For comparison, a TPR profile of pure MWCNT$_{ox}$ was also recorded. It shows one broad peak at 680° C., due to decomposition of oxygen-containing surface groups. The TPR profile of the s-MnO$_x$/MWCNT$_{ox}$ shows three pronounced peaks. Similar to the pure s-MnO$_x$ sample, the first peak at 283° C. is assigned to the reduction of Mn$^{4+}$ to Mn$^{3+}$ (MnO$_2$ to Mn$_2$O$_3$) and possesses a shoulder to the lower temperature side. In contrast to the pure manganese oxide (s-MnO$_x$), the reduction signal assigned to Mn$^{3+}$→Mn$^{2+}$ at 397° C. does not split and the intermediate formation of Mn$_2$O$_3$ cannot be resolved. The third broad peak at 555° C. is attributed to the reduction of surface groups of the oxidized MWCNTs. Again, the increased reactivity compared to the transition metal-free system is tentatively attributed to a catalytic function of the highly dispersed Mn oxide during thermal treatment. The relative increase of this high temperature TPR signal may be explained with the creation of additional defects on the CNTs due to the presence of the strong oxidant KMnO$_4$ during synthesis (see above). Due to the apparent similarity of the reduction temperatures and profiles of the first two TPR signals to pure manganese oxide, the Mn oxide phase in the supported sample is assumed to be identical or very similar to the s-MnO$_x$ material in the unsupported case. Assuming that reduction to MnO is completed after the second peak, a similar average oxidation state of Mn in the starting material of Mn$^{3.56+}$ (MnO$_{1.78}$) can be calculated by Integration of the first two TRP signals. The presence of pure MnO after reduction at 700° C. is confirmed by XRD (not shown).

SEM images of the s-MnO$_x$/MWCNT$_{ox}$ after calcination at 150° C. are shown in FIG. 1-C,D. Areas with large manganese agglomerates cannot be observed. In accordance with the TG-MS data, there is no damage of the MWCNTs due to starting combustion detectable even at high magnifications. SEM-EDX studies confirm that the oxidized tubes are relatively homogeneously coated with manganese oxide particles with local concentrations between 4.5 and 7.0 wt.-%, in agreement with the integral XRF analysis.

Figure 10:
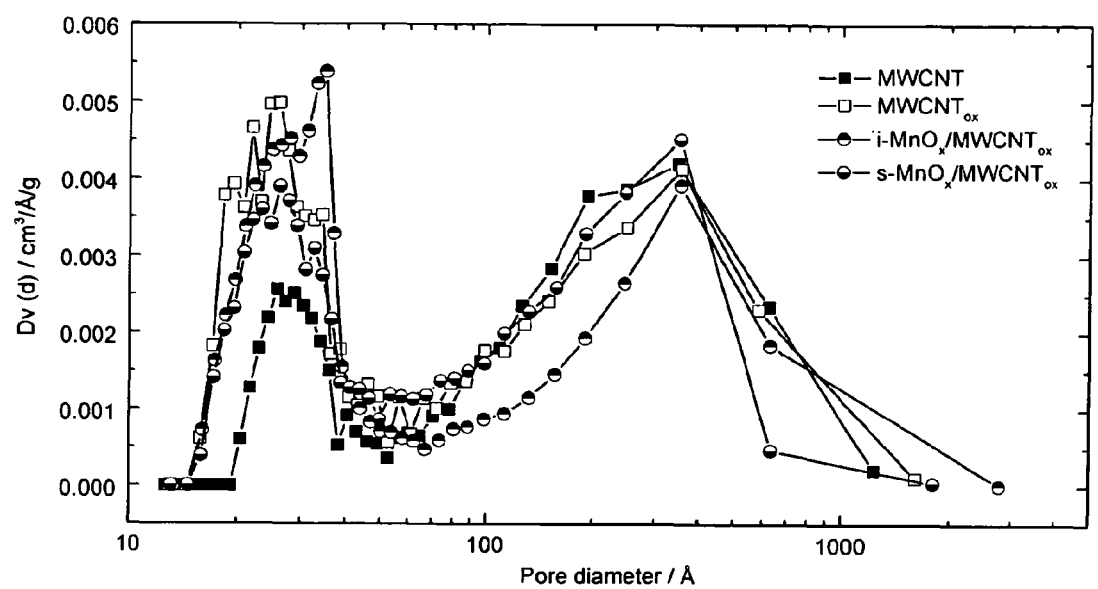
FIG. 10: Pore size distributions of MWCNT -■-, MWCNT$_{ox}$ -□-, s-MnO$_x$/MWCNT$_{ox}$ -●- and i-MnO$_x$/MWCNT$_{ox}$ -◆- samples.

The BET surface area decreased from 316 m$^2$/g for the pure MWCNT$_{ox}$ to 240 m$^2$/g after deposition of Mn oxide. The s-MnO$_x$/MWCNT$_{ox}$ sample presents a typical type IV isotherm, with a clear hysteresis at high P/P$_0$. The pore size distribution calculated from the desorption branch of the isotherm using the BJH method shows a bimodal distribution (FIG. 10). Pores below a diameter of 3 nm are assigned to the inner channel of the nanotubes, whereas larger pores >10 nm are formed between the entangled nanotubes. FIG. 10 reveals that the volume of the small pores decreased after deposition of the Mn oxide. The most likely explanation is that MnO$_x$ particles also formed at the tubes tips as well as inside the CNTs, thus blocking the inner channel of some of the CNTs.

Figure 11:
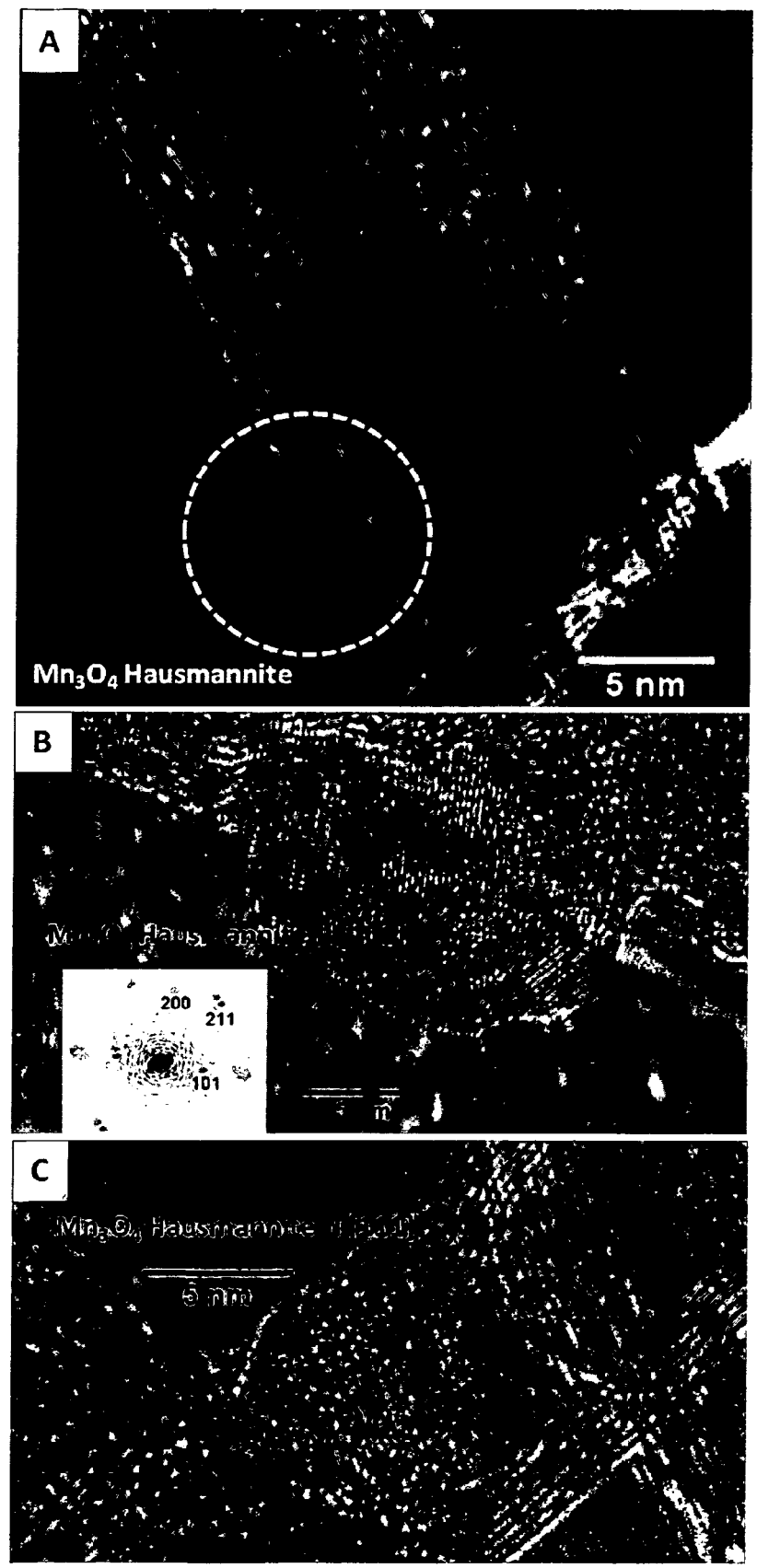
FIG. 11: TEM images of s-MnO$_x$/MWCNT$_{ox}$ (A) and i-MnO$_x$/MWCNT$_{ox}$ (B, C).

The TEM image of the s-MnO$_x$/MWCNTs in FIG. 11 shows a single particle of Mn$_3$O$_4$ (Hausmannite) with a size of approximately 5 nm. However, following the experience of pure manganese oxide it cannot be safely concluded whether the Mn$_3$O$_4$ has formed during the preparation or under the reducing conditions of the electron beam in the microscope. Nevertheless it can be assumed that the particle size would not change significantly during such beam-induced reduction, and the successful nanostructuring of the Mn oxide phase by dispersion on MWCNTs is evidenced by this result.

Figure 12:
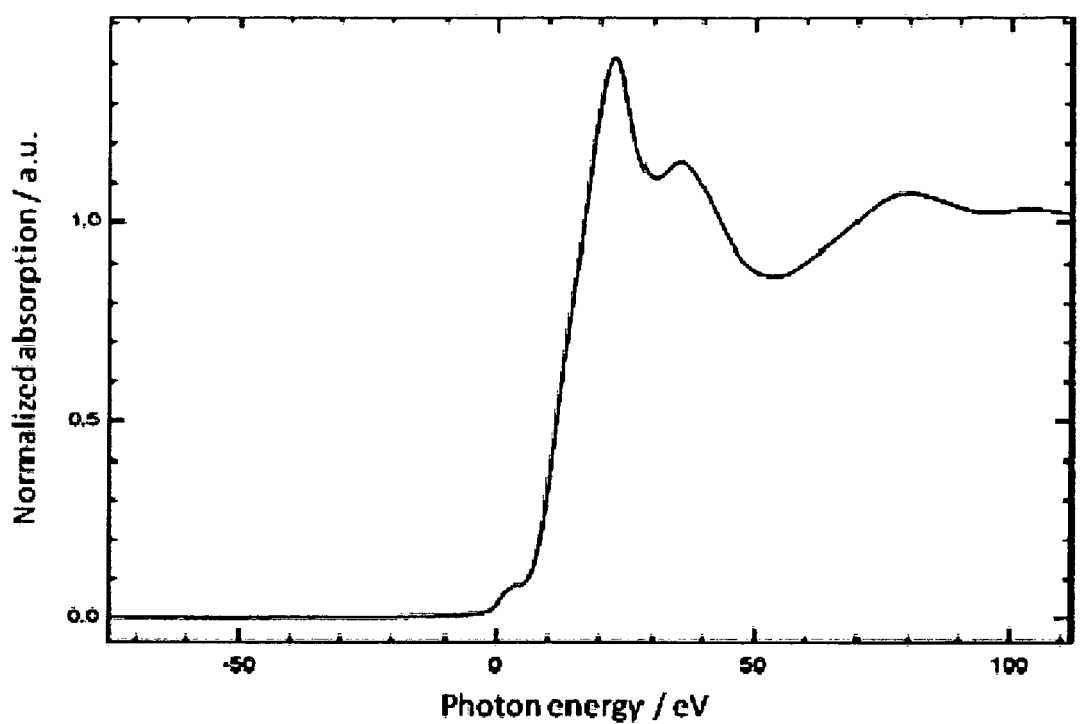
FIG. 12: Mn K-XANES of as-prepared s-MnO$_x$/MWCNT$_{ox}$. The spectrum is shown relative to the edge position of Mn metal (6539 eV).

Further insight into the initial oxidation state of the sample s-MnO$_x$/MWCNT$_{ox}$ was provided by Mn K-edge XANES (FIG. 12). In contrast to the L-edge NEXAFS, K-edge XANES is bulk sensitive. The edge position was determined to be shifted by 12.2 eV compared to that of metallic Mn reference at 6539 eV. With respect to Mn oxide references such a shift is characteristic for an average valence of ~3.4. Thus, the valence information extracted from the Mn K-edge XANES is well consistent with the results obtained from TPR analysis. The estimated depth of information in the NEXAFS experiment is here at 5-8 nm, which is in the range of particle sizes observed in TEM. Although NEXAFS is a surface sensitive method, it can be assumed, that the spectra are representative for the bulk of the present nanostructured Mn-phase. FIGS. 6b and 7b present the Mn L-edge during the calcination of the MWCNT$_{ox}$ supported manganese oxide in 0.25 mbar O$_2$. In the as-prepared state, the NEXAFS spectrum can be simulated with Mn$^{2+}$ and Mn$^{4+}$ species. The former may be an effect of reduction in the near-surface region of the nanoparticles. In agreement with the previous results, the average oxidation state of the sample is estimated to +3.55. Alike the bulk reference sample s-MnO$_x$, the Mn$^{4+}$ component firstly decreases with increasing temperature and later comes back at 400° C. at the expanse of Mn$^{2+}$ and Mn$^{3+}$. This intermediate oxidation is considerably weaker compared to s-MnO$_x$ and an average oxidation state of only +3.04 is reached, while it was +2.83 at 350° C. before the re-oxidation took place. At 450° C. already thermal reduction sets in and the fraction of $Mn^{4+}$ lowered again. The lower reaction temperature compared to s-$MnO_x$ can the attributed to the smaller particle size.

In summary, the results obtained on the s-$MnO_x$/MWCNT$_{ox}$ sample show that by symproportionation it was possible to produce a nanostructured, MWCNT$_{ox}$ supported manganese oxide, with similar redox properties as the unsupported manganese oxide sample s-$MnO_x$. The TPR, K-edge XANES and L-edge NEXAFS analyses show that a large part of the sample is present in the oxidation state +IV. In-situ NEXAFS measurements confirm the variability of the oxidation state of Mn in the electrode material with variation of the pre-treatment temperature and the oxygen partial pressure.

i-$MnO_x$/MWCNT$_{ox}$ Sample

An i-$MnO_x$/MWCNT$_{ox}$ sample was prepared with a nominal content of 5.0 wt.-% Mn/C. The sample was prepared by incipient wetness impregnation. Accordingly, the oxidized MWCNTs were first impregnated with water to fill their inner channel, followed by the addition of an aqueous solution of manganese(II)nitrate. The sample was dried following a 2-step process: first at 60° C. to allow the Mn nitrate to further spread over the surface of the sample, then at 110° C. to favor its slow dehydration and reaction with the OH groups present on the surface of the oxidized CNTs. Finally, the material was calcined at 300° C. to fully decompose the Mn precursor.

XRD revealed that the formed $MnO_x$ was X-ray amorphous like the other samples (FIG. 8).

After calcination at 300° C., no areas with agglomerates of manganese could be found in the SEM images (FIG. 1-E,F). The SEM-EDX analysis detected a local manganese concentration of 6.4±0.6 wt %. Thus the manganese distribution is nearly homogeneous and close to the nominal 5 wt % Mn/C.

The specific surface, measured by $N_2$ physisorption, is 332 $m^2$/g for the calcined sample (300° C.). Thus, the MWCNT$_{ox}$ surface modified with manganese oxide particles is slightly larger than the surface of pure oxidized MWCNTs (316 $m^2$/g), which may be explained with the starting decomposition of the carbon material. The pore size analysis reveals a slightly increasing contribution corresponding to small pores in comparison to MWCNT$_{ox}$, which is in line with the small damages observed in the SEM images and which arise from the catalyzed oxidation of the CNT around the $MnO_x$ particles. Both observations point towards a different redox behavior of i-$MnO_x$/MWCNT$_{ox}$ compared to s-$MnO_x$/MWCNT$_{ox}$.

The TEM micrographs in FIG. 11-B,C of i-$MnO_x$/MWCNT$_{ox}$ shows single particles of $Mn_3O_4$ (Hausmannite) of approximately 5-10 nm. However, following the experience of pure manganese oxide it again cannot be decided whether the $Mn_3O_4$ has formed during the preparation or under the conditions in the microscope.

Figure 13:
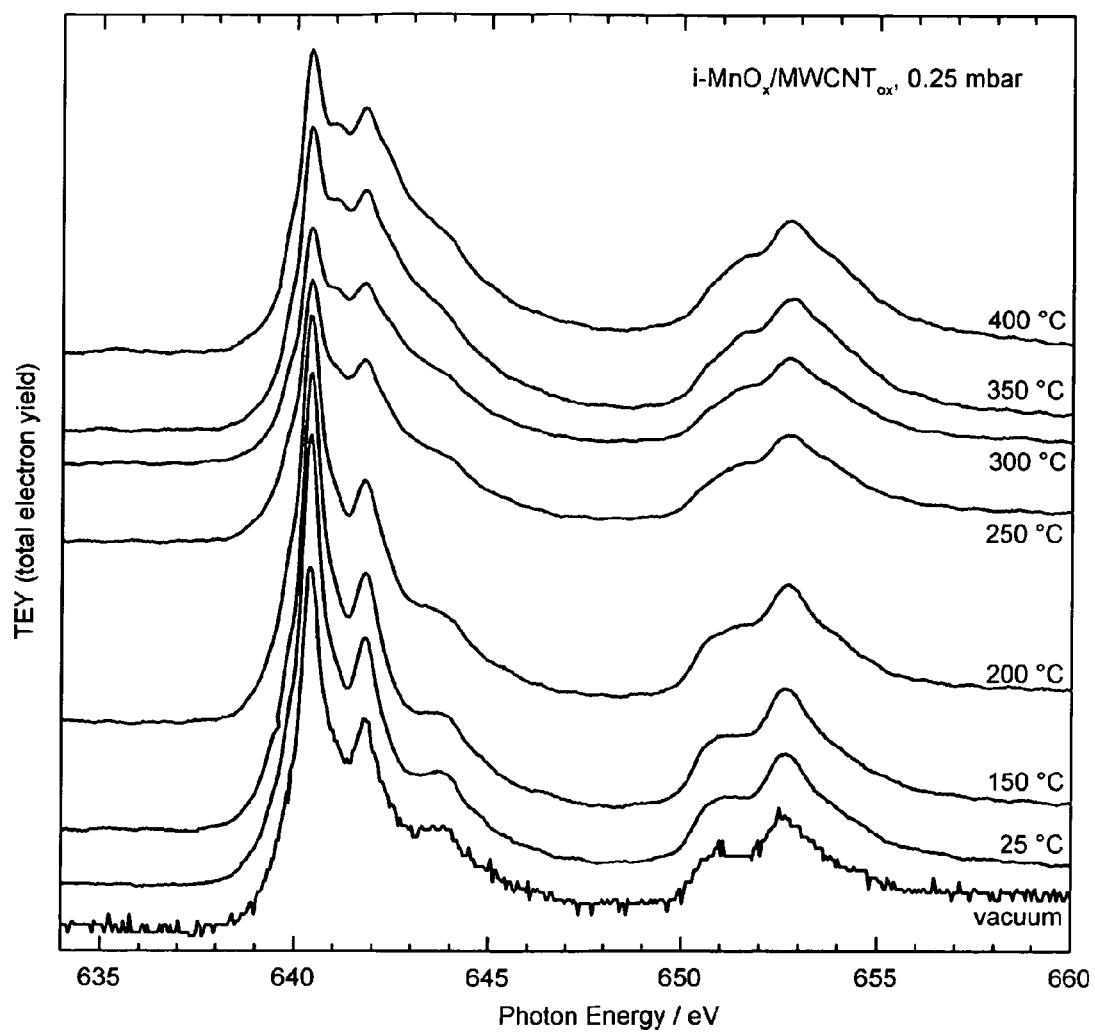
FIG. 13: Mn L-NEXAFS spectra of the MWCNT$_{ox}$ supported manganese oxide (i-MnO$_x$/MWCNT$_{ox}$) and its decomposition products in 0.5 mbar O$_2$, at different temperatures, i.e. vacuum, 25° C., 150° C., 200° C., 250° C., 300° C., 350° C. and 400° C. from the lower spectrum to the upper spectrum.

FIG. 13 presents the NEXAFS study of i-$MnO_x$/MWCNT$_{ox}$ and shows the Mn L-edge evolution during the simulated calcination in 0.25 mbar $O_2$. The as-prepared material consists exclusively of $Mn^{2+}$ as is expected by impregnation with manganese(II)nitrate solution. In contrast to the s-$MnO_x$ samples, this sample is first oxidized upon heating and the $Mn^{3+}$ component increases with increasing temperature. Heating to 400° C. results in a mixture of $Mn^{2+}$ and $Mn^{3+}$. The average oxidation state gradually increases from +2.0 to +2.63 at 400° C.

The Mn oxide particles obtained by incipient impregnation are of a size comparable to those prepared by symproportionation. However, from the NEXAFS results, it is evident that the oxidation state of manganese and its evolution with heat treatment is different. While in s-$MnO_x$/MWCNT$_{ox}$ a large fraction of $Mn^{4+}$ was present, a divalent manganese species were exclusively found in i-$MnO_x$/MWCNT$_{ox}$. While the Mn centers in s-$MnO_x$/MWCNT$_{ox}$ were reduced upon heating, those in i-$MnO_x$/MWCNT$_{ox}$ were found to be oxidized but without the formation of $Mn^{4+}$.

Figure 14:
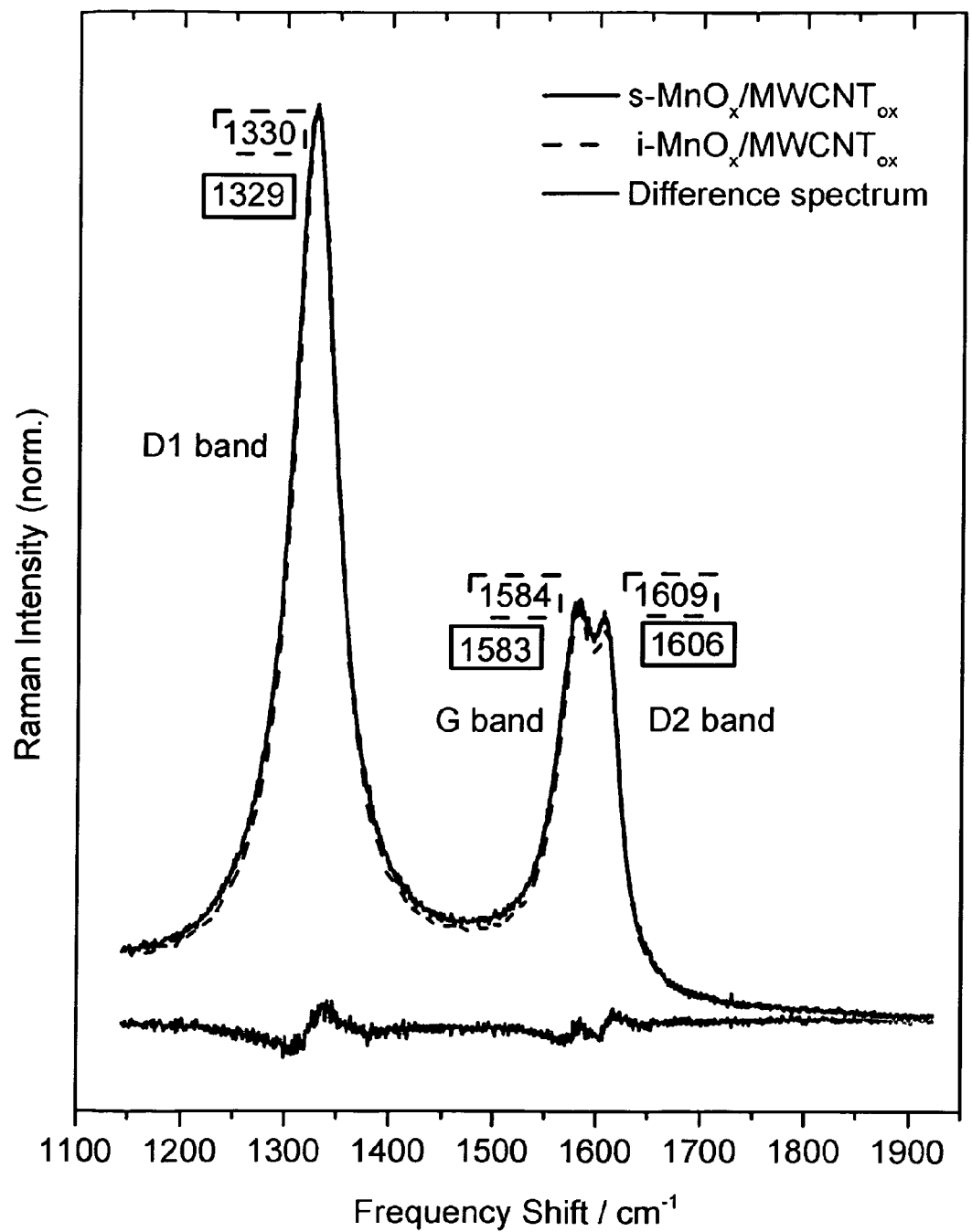
FIG. 14: Raman of s-MnO$_x$/MWCNT$_{ox}$ (- -) and i-MnO$_x$/MWCNT$_{ox}$ (- -) and difference spectrum in light gray.

To investigate possible differences of the MWCNT support in the two supported electrode materials arising from the different preparation procedure, Raman spectroscopy and C is XPS was applied. The thermal analyses suggested that a higher defect concentration may have been generated by the use of strongly oxidizing $MnO_4^-$ solution during preparation of s-$MnO_x$/MWCNT$_{ox}$. Such additional defects may affect the conductive properties of the composite electrode and its electrocatalytic properties and should be reflected in the Raman and carbon core level spectra. No significant difference could be observed in the Raman or C 1s spectra, which are presented as supporting information (FIG. 14). Thus, the amount of amorphous and graphitic carbon was unchanged in the CNT support and differences in the electrocatalytic performance are likely not related to the CNT support.

Electrocatalytic Properties

Both, the s-$MnO_x$/MWCNT$_{ox}$ and the i-$MnO_x$/MWCNT$_{ox}$ sample were tested for their electrocatalytic activity and stability with respect to the water splitting (oxygen evolution reaction) under neutral pH conditions using the electrocatalytic measurement conditions as described above.

Figure 15:
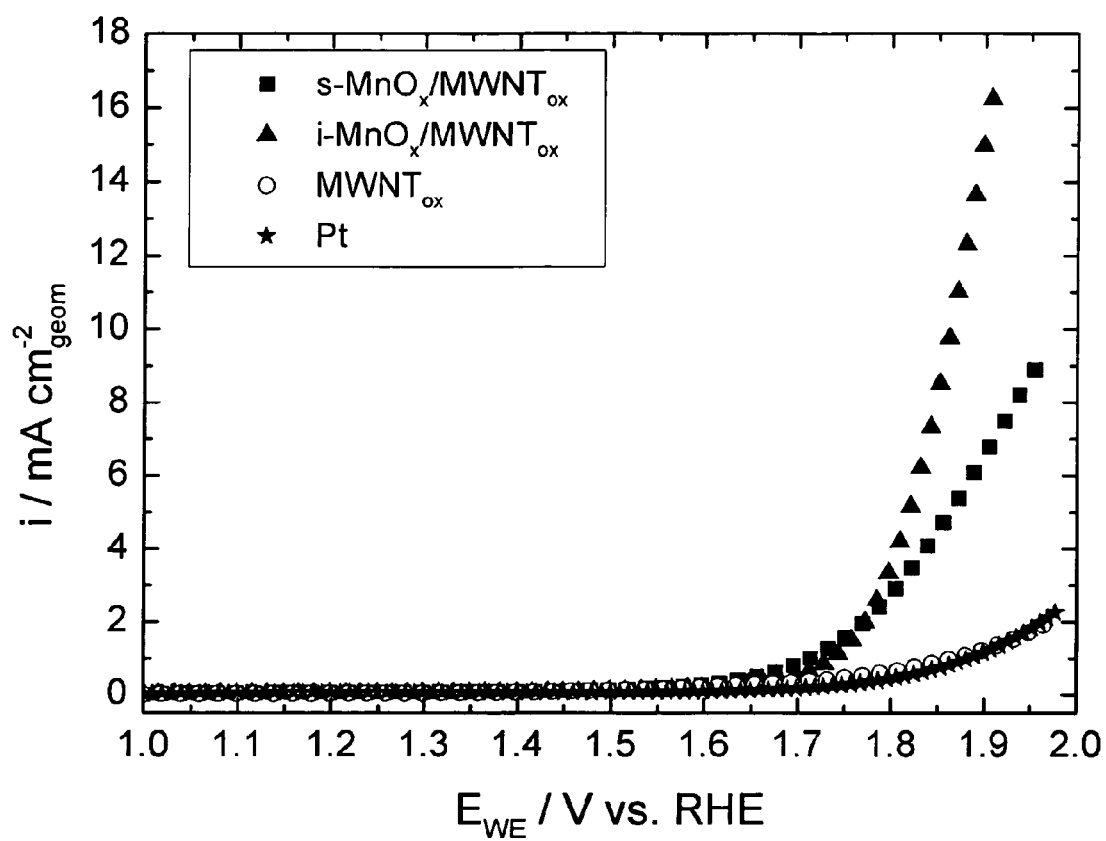
FIG. 15: Electrocatalytic activity for OER of s-MnO$_x$/MWCNT$_{ox}$, i-MnO$_x$/MWCNT$_{ox}$ and MWCNT$_{ox}$. Rotating disk electrode measurements has been conducted at 1600 rpm in 0.1 M potassium phosphate buffer at pH 7. Electrode potential has been sweeped between 1.0V and 2.0V vs. RHE with rate of 6 mV/s.

FIG. 15 compares the electrocatalytic OER activity of s- and i-$MnO_x$/MWCNT$_{ox}$ during linear electrode potential sweeps at neutral pH with that of the carbon support and a Pt reference electrocatalyst. Both $MnO_x$/MWCNT$_{ox}$ composites showed high catalytic activity during the anodic voltammetric scans. In particular, the activity of the Mn oxide materials significantly exceeded the catalytic activity of pure Pt. The overpotential of both $MnO_x$/MWCNT$_{ox}$ at 2 mA cm$^{-2}$ was 190 mV lower than for Pt. The MWCNT$_{ox}$ support showed only little catalytic activity and was comparable to pure Pt.

Our results demonstrate that the electrocatalytic efficiency (overpotential) of Mn-catalyzed hydrogen/oxygen production in neutral pH conditions such as pH 7 (1.8 V/RHE at 8 mA/cm2) is comparable to that of the most active electrodeposited $MnO_x$ films in highly alkaline media (1.7 V/RHE).

FIG. 15 also clearly highlights distinct differences in the electrochemical behavior between the two $MnO_x$/MWCNT$_{ox}$. At a current density of 1 mA cm$^{-2}$ a 20 mV lower overpotential was obtained for the s-$MnO_x$/MWCNT$_{ox}$ than i-$MnO_x$/MWCNT$_{ox}$. In contrast, at a technologically more relevant current density of 8 mA cm$^{-2}$ i-$MnO_x$/MWCNT$_{ox}$ showed a 120 mV lower overpotential than s-$MnO_x$/MWCNT$_{ox}$.

Thus, s-$MnO_x$/MWCNT$_{ox}$ reveals a lower, and hence more favorable onset potential for the OER, whereas i-$MnO_x$/MWCNT$_{ox}$ is catalytically more active at higher electrode potentials and current densities.

The following table summarizes the overpotentials achieved by the present composites, i.e. s-$MnO_x$/CNT and i-$MnO_x$/CNT, and composites obtained as indicated in the table.

| Number | Sample description | Overpotential* [mV] |
|---|---|---|
| 9812 | Pure CNT support | — |
| 11742 | s-MnOx/CNT | 0.543 |
| 11759 | i-MnOx/CNT | 0.544 |

-continued

| Number | Sample description | Overpotential* [mV] |
|---|---|---|
| 13544 | 10% Mn, 2-step drying | 0.576/0.613 (repro) |
| 13669 | 10% Mn, 2-step drying, calc 300° C. | 0.530 |
| 13543 | 10% Mn, 1-step drying, calc 300° C. | 0.464 |
| 13542 | 10% Mn, 2-step drying, calc 400° C. | 0.579 |

*OER overpotentials at 1 mA/cm$^2$

Our correction for the ohmic potential drops for each catalytic measurement excludes differences in specific conductivity of the samples as origin for the observed reactivity differences. We also note that the hypothetical faradaic current density corresponding to the conversion of all Mn species into the oxidation state +IV at the scan rate of FIG. 15 would be insufficient to explain the current densities observed. Atomic-scale geometric and electronic structural factors accounting for the difference in catalytic water splitting activity may include the difference in surface area between the two supported materials (332 m$^2$/g for i-MnO$_x$, while 240 m$^2$/g for the s-MnOx material); also, the presence of a lower average initial oxidation state of Mn between +II and +III in the i-MnOx material compared to the s-MnOx catalyst, which could be associated with structural motifs involving more hydroxyl OH ligands rather than Mn-bridging O ligand may contribute to the observed catalytic activity trends. Based on this, we would predict that at prolonged OER relevant electrode potentials, where Mn is preferably present in the +IV state and would transform from the initial oxidation states, the two MnO$_x$ materials could gradually narrow their activity difference.

Figure 16:
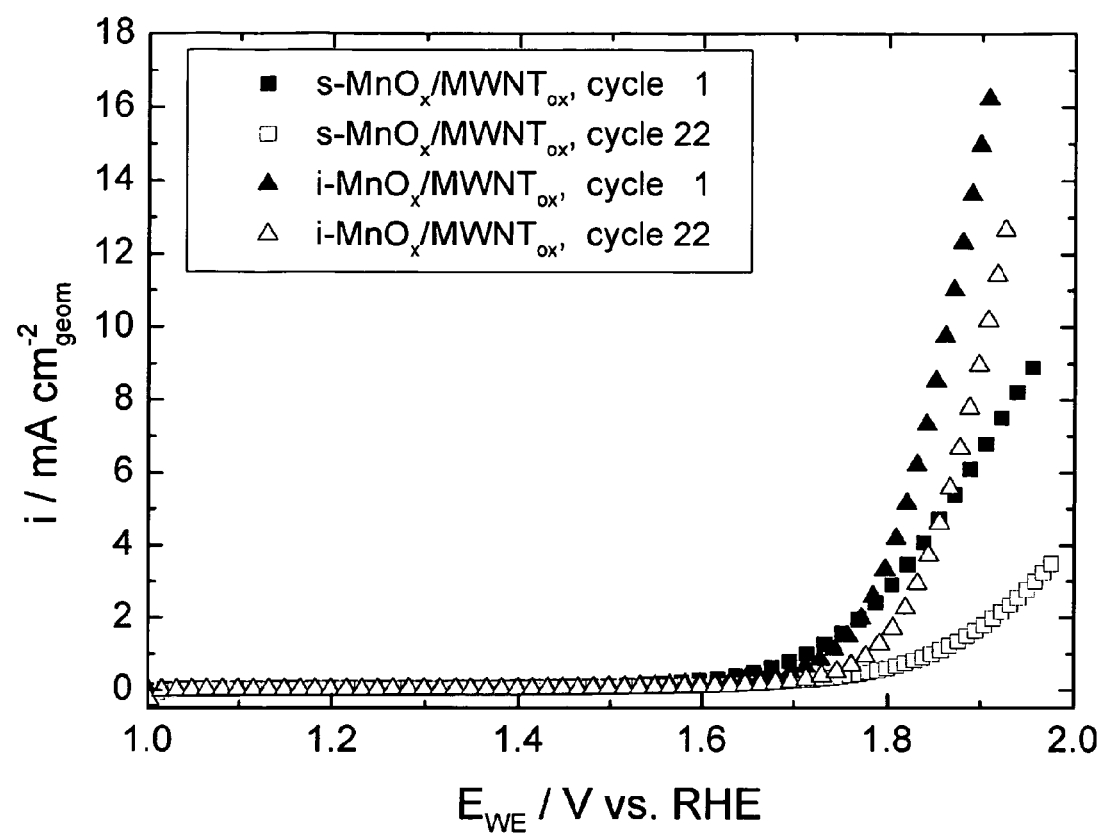
FIG. 16: Electrocatalytic stability for OER of s-MnO$_x$/MWCNT$_{ox}$ (■) and i-MnO$_x$/MWCNT$_{ox}$ (▲) before and after stability test as compared to MWNT$_{ox}$ (○) and Pt (*). Stability test consisted of 22 potential cycles between 1.0 V and 2.0 V vs. RHE with rate of 100 mV s$^{-1}$. RDE measurements has been conducted at 1600 rpm in 0.1 M potassium phosphate buffer at pH 7.

The stability of both MnO$_x$/MWCNT$_{ox}$ samples was investigated using cyclic voltammetry between 1.0 V and 2.0 V as described above and is shown in FIG. 16. The anodic linear sweep scan after 20 potential cycles led to a loss in activity for both MnO$_x$/MWCNT$_{ox}$ composites, with s-MnO$_x$/MWCNT$_{ox}$ showing a significantly higher overpotential increase (activity loss) than i-MnO$_x$/MWCNT$_{ox}$. At a current density of 2 mA cm$^{-2}$ the overpotential for s-MnO$_x$/MWCNT$_{ox}$ and i-MnO$_x$/MWCNT$_{ox}$ increased by 140 mV and 40 mV, respectively. In contrast to the MnO$_x$/MWCNT$_{ox}$, the potential cycling of MWCNT$_{ox}$ led to an unexpected decrease in overpotential but without exceeding the catalytic activity of the aged s-MnO$_x$/MWCNT$_{ox}$.

Comparative Examples

Comparative 4 wt.-% and 10 wt.-% i-MnO$_x$/SBA-15 samples have been prepared by the same procedure as outlined above for the i-MnO$_x$/MWCNT$_{ox}$ except for using an SBA-15 mesoporous silica support.

Figure 17:
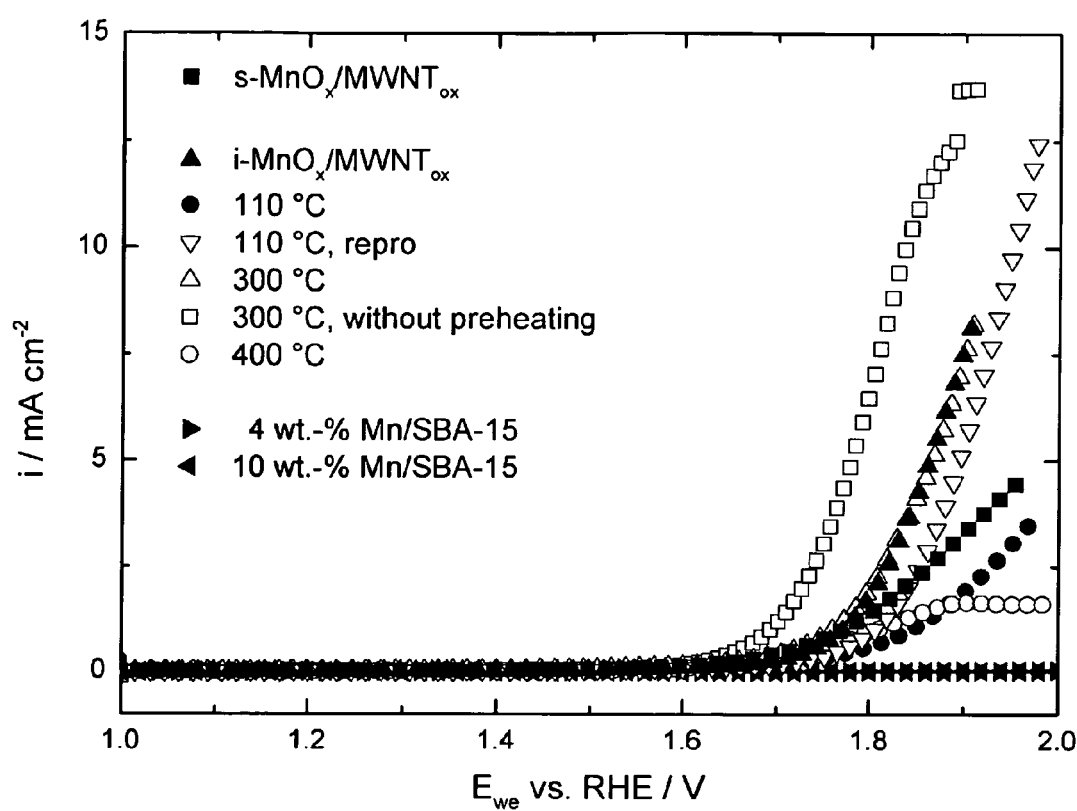
FIG. 17: Electrocatalytic activity for OER of s-MnO$_x$/MWCNT$_{ox}$ (■) and i-MnO$_x$/MWCNT$_{ox}$ (▲) as compared vis-à-vis different calcination and drying conditions during preparation, i.e. i-MnO$_x$/MWCNT$_{ox}$ calcinated at 400° C. (○), i-MnO$_x$/MWCNT$_{ox}$ directly calcinated at 300° C. without predrying (□) and i-MnO$_x$/MWCNT$_{ox}$ solely dried at 110° C. (● and ▽). Moreover, comparision of electrocatalytic activity vis-à-vis a 4 wt.-% (▶) and a 10 wt.-% MnO$_x$/SBA-15 (◀) samples.

As is illustrated in FIG. 17, both SBA-15-supported MnO$_x$ samples do not show an electrocatalytic OER activity under neutral pH conditions using the electrocatalytic measurement conditions as described above. It is observed that the lacking OER activity of these SBA-15 supported samples is independent from the loading of MnO$_x$, i.e. 4 wt.-% or 10 wt.-% MnO$_x$, hence it is concluded that the silica support impairs the electrocatalytic OER activity, which might be due to an insufficient conductivity of the SBA-15 support.

CONCLUSIONS

From the above it can be concluded that both the incipient wetness composite (i-MnO$_x$/MWCNT$_{ox}$) and the symproportionation precipitation composite (s-MnO$_x$/MWCNT$_{ox}$) are a viable water splitting electrocatalysts at neutral pH. However, the incipient wetness preparation of supported MnO$_x$ led to more active and more stable electrocatalyst than the symproportionation preparation. The variation in catalytic activity between both catalysts, i.e. i-MnO$_x$/MWCNT$_{ox}$ and s-MnO$_x$/MWCNT$_{ox}$, could be caused by a variety of structural and electronic differences, such as oxidation states, Mn—O bonding and bond distances, crystallinity and long range order, or variations in surface area and dispersion on the support or in support interactions between the two MnO$_x$ materials. Catalyst degradation as observed in FIG. 15 can be rationalized by loss of the lower Mn oxidation states or Mn ion dissolution during oxidation-reduction cycles or the formation of inactive forms of the MnO$_2$ species, e.g. due to changes in the crystallinity. Without wishing to be bound to a theory, at present, we relate the differences in performance of the two composites to the significant differences of initial oxidation states of Mn and their evolution (FIGS. 6b and 6c). Further, we conclude that an initially low oxidation state around +II already after preparation as in i-MnO$_x$/MWCNT$_{ox}$ might be preferable compared to higher oxidation states near +IV as in s-MnO$_x$/MWCNT$_{ox}$. Moreover, the particularly beneficial effect of the i-MnO$_x$/MWCNT$_{ox}$ might be caused by special effects of in-situ electro-oxidation of Mn(II) under working conditions on the material's crystallinity and defect structure compared to the effects of chemical oxidation during synthesis.

Finally, the i-MnO$_x$/MWCNT$_{ox}$ and the s-MnO$_x$/MWCNT$_{ox}$ composite of the invention are both superior in the electrocatalytic splitting of water under neutral pH conditions as compared to SBA-15 silica-supported MnO$_x$ composites.

The invention claimed is:

1. A process comprising:
    forming a composite comprising a carbon-based support and a manganese oxide (MnO$_x$) by a symproportionation precipitation method, wherein the manganese oxide is nanoparticular and comprises a mixture of Mn (+III) and Mn (+IV) or a mixture of Mn (+II) and Mn (+III); and
    electrolytically splitting water having a pH in the range of 4.5 to 8.5 using the composite.

2. The process of claim 1, wherein the MnO$_x$ is homogenously dispersed and deposited on the carbon-based support.

3. The process of claim 1, wherein the carbon-based support is a carbon-nanotube (CNT).

4. The process of claim 1, wherein the water comprises waste water, seawater and/or freshwater, and wherein the composite is used as an oxygen evolution electrode.

5. The process of claim 1, wherein the symproportionation precipitation method comprises the step of:
    (a) providing the carbon-based support with a manganese oxide precursor,
    (b) adding a symproportionation precipitation agent,
    (c) drying, and
    (d) calcinating.

6. The process of claim 5, wherein the manganese oxide precursor is a Mn (+II) salt.

7. The process of claim 5, wherein step (b) is carried out at a temperature of below 100° C.

8. The process of claim 5, wherein the manganese oxide precursor is a Mn (+II) salt, and the symproportionation precipitation agent is a Mn (+VII) salt.

9. The process of claim 5, further comprising the step of:
functionalizing the carbon-based support prior to step (a) to create linker groups for the manganese oxide precursor.

10. The process of claim 5, wherein the calcination temperature in step (d) is in a range from 150° C. to 450° C.

* * * * *

UNITED STATES PATENT AND TRADEMARK OFFICE
CERTIFICATE OF CORRECTION

PATENT NO. : 9,797,052 B2  
APPLICATION NO. : 14/381706  
DATED : October 24, 2017  
INVENTOR(S) : Robert Schlögl et al.

Page 1 of 1

It is certified that error appears in the above-identified patent and that said Letters Patent is hereby corrected as shown below:

In the Specification

At Column 4, Line 39, the words "oxidation sate" should read --oxidation state--  
At Column 12, Lines 61-62, the word "symproporationation" should read --symproportionation--  
At Column 13, Line 21, the word "nanoparticlular" should read --nanoparticular--  
At Column 13, Line 62, the words "oxidation sate" should read --oxidation state--  
At Column 15, Line 38, the word "comparision" should read --comparison--  
At Column 24, Line 11, "C is XPS" should read --C Is XPS--

Signed and Sealed this  
Twentieth Day of February, 2018

Andrei Iancu  
*Director of the United States Patent and Trademark Office*